US012777432B2

(12) United States Patent
Salim et al.

(10) Patent No.: US 12,777,432 B2
(45) Date of Patent: Oct. 27, 2026

(54) METHODS, ARCHITECTURES, APPARATUSES AND SYSTEMS FOR DETERMINATION OF SIDELINK TRANSMISSION POWER

(71) Applicants: InterDigital Patent Holdings, Inc., Wilmington, DE (US); NEW YORK UNIVERSITY, New York, NY (US)

(72) Inventors: Umer Salim, Vallauris (FR); Sanjay Goyal, Deer Park, NY (US); Ashutosh Srivastava, Brooklyn, NY (US); Ravikumar Pragada, Warrington, PA (US); Pei Liu, Falls Church, VA (US); Shivendra Panwar, Freehold, NJ (US)

(73) Assignees: INTERDIGITAL PATENT HOLDINGS, INC., Wilmington, DE (US); NEW YORK UNIVERSITY, New York, NY (US)

( * ) Notice: Subject to any disclaimer, the term of this patent is extended or adjusted under 35 U.S.C. 154(b) by 122 days.

(21) Appl. No.: 18/832,288

(22) PCT Filed: Jan. 27, 2023

(86) PCT No.: PCT/US2023/011737
§ 371 (c)(1),
(2) Date: Jul. 23, 2024

(87) PCT Pub. No.: WO2023/147052
PCT Pub. Date: Aug. 3, 2023

(65) Prior Publication Data

US 2025/0119849 A1 Apr. 10, 2025

Related U.S. Application Data

(60) Provisional application No. 63/303,721, filed on Jan. 27, 2022.

(51) Int. Cl.
*H04W 52/38* (2009.01)
*H04W 52/24* (2009.01)

(52) U.S. Cl.
CPC ....... *H04W 52/383* (2013.01); *H04W 52/242* (2013.01); *H04W 52/243* (2013.01)

(58) Field of Classification Search
CPC ............. H04W 52/383; H04W 52/242; H04W 52/243; H04W 52/42; H04W 52/0245;
(Continued)

(56) References Cited

U.S. PATENT DOCUMENTS 11,388,681 B2 * 7/2022 Yang .................. H04W 52/244
2011/0039574 A1 * 2/2011 Charbit ................ G01S 5/0215 455/67.14
(Continued)

FOREIGN PATENT DOCUMENTS

JP 2021500791 A 1/2021
WO WO 2012044382 A1 4/2012
(Continued)

OTHER PUBLICATIONS

3rd Generation Partnership Project; Technical Specification Group Services and System Aspects; Study on enhancement of 3GPP Support for 5G V2X Services (Release 16); 3GPP TR 22.886 V16.2.0, Dec. 2018, 76 pages.
(Continued)

*Primary Examiner* — Andrew Wendell
(74) *Attorney, Agent, or Firm* — VOLPE KOENIG

(57) ABSTRACT

Procedures, methods, apparatuses, devices, and computer program products for determining sidelink transmission power. A first Wireless Transmit/Receive Unit, WTRU senses for at least one signal, using: a first receive beam in a first direction associated with an upcoming sidelink unicast transmission to a target WTRU and (2) a second receive
(Continued)

beam for in an opposite direction, determines, from the sensed signal(s), scheduled transmissions that will interfere with the upcoming sidelink unicast transmission based on the scheduled transmissions overlapping in time and frequency with the upcoming sidelink unicast transmission, determines a transmission power to compensate for: (1) pathloss and (2) estimated interference at the target WTRU of scheduled transmissions interfering with and that have a lower priority than the upcoming sidelink unicast transmission, the estimated interference based on respective sensed signal received signal strengths, and sends to the target WTRU data in the sidelink unicast transmission using the determined transmission power.

20 Claims, 15 Drawing Sheets

(58) Field of Classification Search
CPC ........... H04W 52/245; H04W 52/0238; H04W 52/24; H04W 72/25; H04W 72/40
See application file for complete search history.

(56) References Cited

U.S. PATENT DOCUMENTS

| | | | | |
|---|---|---|---|---|
| 2013/0324182 | A1* | 12/2013 | Deng | H04W 52/242 455/522 |
| 2018/0123256 | A1* | 5/2018 | Henry | H01Q 19/08 |
| 2020/0305167 | A1* | 9/2020 | Freda | H04W 72/569 |
| 2022/0338255 | A1* | 10/2022 | Abotabl | H04L 5/14 |
| 2023/0144397 | A1* | 5/2023 | Ye | H04L 1/1864 370/329 |
| 2023/0180140 | A1* | 6/2023 | Wang | H04L 5/0037 370/336 |
| 2023/0189249 | A1* | 6/2023 | Zhou | H04W 72/21 370/329 |
| 2023/0224121 | A1* | 7/2023 | Ganesan | H04L 5/0051 455/456.1 |
| 2023/0231616 | A1* | 7/2023 | Liu | H04B 7/088 370/329 |
| 2023/0319872 | A1* | 10/2023 | Xue | H04W 16/14 370/329 |
| 2024/0090024 | A1* | 3/2024 | Leon Calvo | H04W 74/0808 |

FOREIGN PATENT DOCUMENTS

| | | | |
|---|---|---|---|
| WO | 2021044382 | A1 | 3/2021 |
| WO | WO 2021063521 | A1 | 4/2021 |
| WO | WO 2023034361 | A1 | 3/2023 |

OTHER PUBLICATIONS

M. H. C. Garcia et al., "A Tutorial on 5G NR V2X Communications," IEEE Communications Surveys & Tutorials Journal, Feb. 2021, 55 pages.

3rd Generation Partnership Project; Technical Specification Group Radio Access Network; NR; Radio Resource Control (RRC) protocol specification (Release 16), 3GPP TS 38.331 V16.0.0, Mar. 2020, 835 pages.

3rd Generation Partnership Project; Technical Specification Group Radio Access Network; Study on evaluation methodology of new Vehicle-to-Everything (V2X) use cases for LTE and NR; (Release 15), 3GPP TR 37.885 V15.3.0, Jun. 2019, 38 pages.

3rd Generation Partnership Project; Technical Specification Group Radio Access Network; NR; Physical layer procedures for data (Release 16), 3GPP TS 38.214 V16.1.0, Mar. 2020, 151 pages.

3rd Generation Partnership Project; Technical Specification Group Radio Access Network; NR; Physical layer measurements (Release 16), 3GPP TS 38.215 V16.3.0, Sep. 2020, 25 pages.

Itri, "Discussion on physical layer structure for NR sidelink," 3GPP Tdoc R1-1908900, 3GPP TSG-RAN WG1 Meeting 98, Prague, CZ, Aug. 26-3, 2019, 7 pages.

3rd Generation Partnership Project; Technical Specification Group Services and System Aspects; Enhancement of 3GPP support for V2X scenarios; Stage 1 (Release 16), 3GPP TS 22.186 V16.2.0, Jun. 2019, 18 pages.

* cited by examiner

METHODS, ARCHITECTURES, APPARATUSES AND SYSTEMS FOR DETERMINATION OF SIDELINK TRANSMISSION POWER

CROSS-REFERENCE TO RELATED APPLICATIONS

This application is a U.S. National Stage Application under 35 U.S.C. § 371 of International Patent Application No. PCT/US2023/011737, filed Jan. 27, 2023, which claims the benefit of U.S. Provisional Patent Application No. 63/303,721, filed Jan. 27, 2022, which is incorporated herein by reference in its entirety.

BACKGROUND

The present disclosure is generally directed to the fields of communications, software and encoding, including, for example, to methods, architectures, apparatuses, systems directed to determining the transmission power of sidelink transmissions.

SUMMARY

The aspects of the present disclosure relate to methods, architectures, apparatuses, systems directed to determining sidelink transmission power. In one aspect of the present disclosure, a Wireless Transmit/Receive Unit, WTRU, senses for at least one signal, using a first receive beam in a first direction associated with an upcoming sidelink unicast transmission to a target WTRU and a second receive beam for in a second direction opposite the first direction, determines, from the at least one sensed signal, scheduled transmissions that will interfere with the upcoming sidelink unicast transmission based on the scheduled transmissions overlapping in time and frequency with the upcoming sidelink unicast transmission, determines a transmission power to compensate for pathloss to the target WTRU and estimated interference at the target WTRU of scheduled transmissions that will interfere with the upcoming sidelink unicast transmission and that have a lower priority than the upcoming sidelink unicast transmission, the estimated interference based on respective received signal strengths of the at least one sensed signal, and sends to the target WTRU data in the sidelink unicast transmission using the determined transmission power.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures (FIGS.) and the detailed description are not to be considered limiting, and other equally effective examples are possible and likely. Furthermore, like reference numerals ("ref") in the FIGS. indicate like elements, and wherein.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Example Communications System

The methods, apparatuses and systems provided herein are well-suited for communications involving both wired and wireless networks. An overview of various types of wireless devices and infrastructure is provided with respect to FIGS. 1A-ID, where various elements of the network may utilize, perform, be arranged in accordance with and/or be adapted and/or configured for the methods, apparatuses and systems provided herein.

Figure 1A:
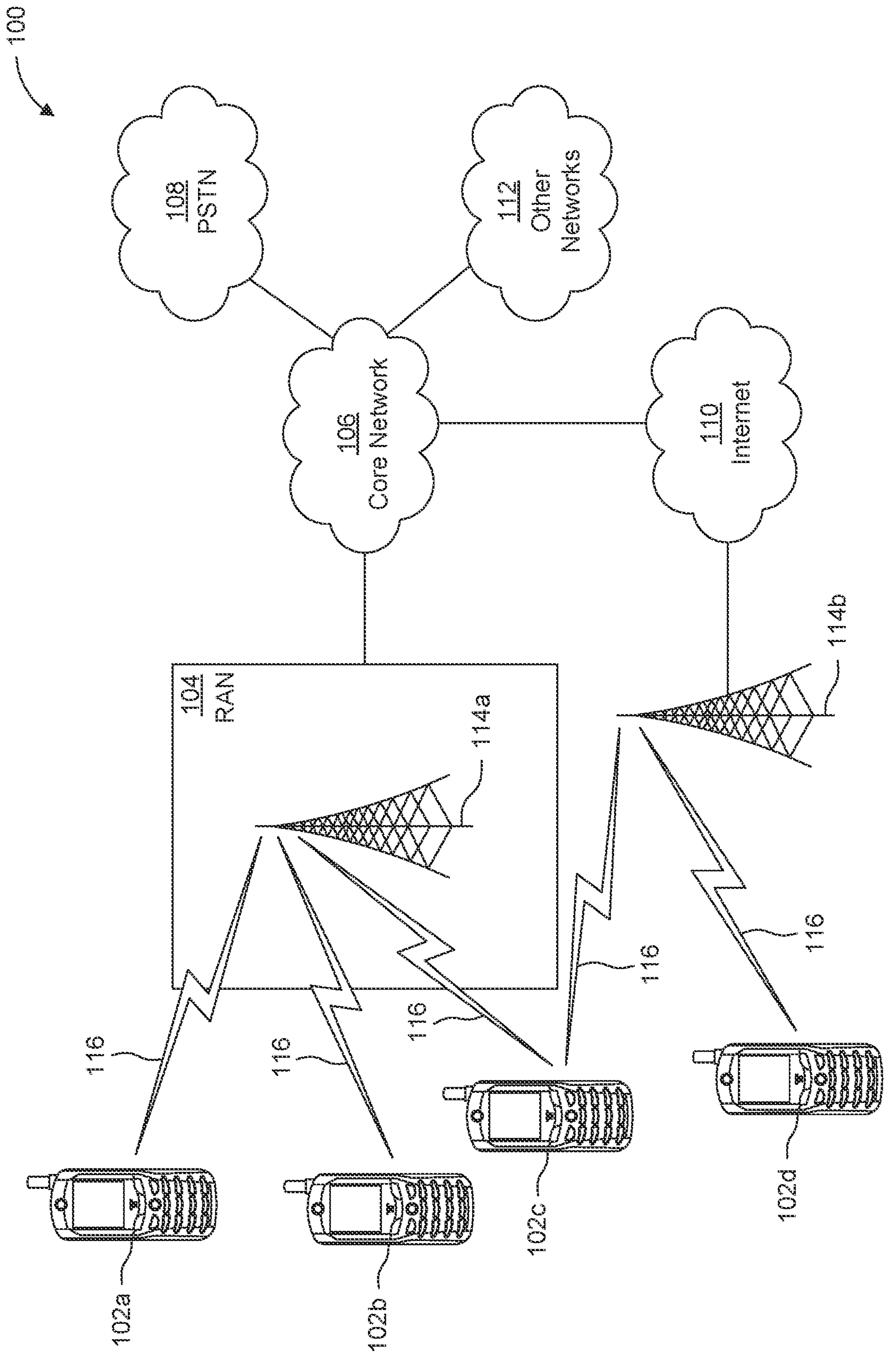
FIG. 1A is a system diagram illustrating an example communications system.

FIG. 1A is a system diagram illustrating an example communications system 100 in which one or more disclosed embodiments may be implemented. The communications system 100 may be a multiple access system that provides content, such as voice, data, video, messaging, broadcast, etc., to multiple wireless users. The communications system

100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail (ZT) unique-word (UW) discreet Fourier transform (DFT) spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104/113, a core network (CN) 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include (or be) a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d*, e.g., to facilitate access to one or more communication networks, such as the CN 106/115, the Internet 110, and/or the networks 112. By way of example, the base stations 114*a*, 114*b* may be any of a base transceiver station (BTS), a Node-B (NB), an eNode-B (eNB), a Home Node-B (HNB), a Home eNode-B (HeNB), a gNode-B (gNB), a NR Node-B (NR NB), a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in an embodiment, the base station 114*a* may include three transceivers, i.e., one for each sector of the cell. In an embodiment, the base station 114*a* may employ multiple-input multiple output (MIMO) technology and may utilize multiple transceivers for each or any sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In an embodiment, the base station 114*a* and the WTRUs 102*a*, 102*b*, 102*c* may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node-B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In an embodiment, the base station 114*b* and the WTRUs 102*c*, 102*d* may utilize a cellular-based RAT (e.g., WCDMA, CDMA2000, GSM, LTE, LTE-A, LTE-A Pro, NR, etc.) to establish any of a small cell, picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing any of a GSM, UMTS, CDMA 2000, WiMAX, E-UTRA, or Wi-Fi radio technology.

The CN 106/115 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/114 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
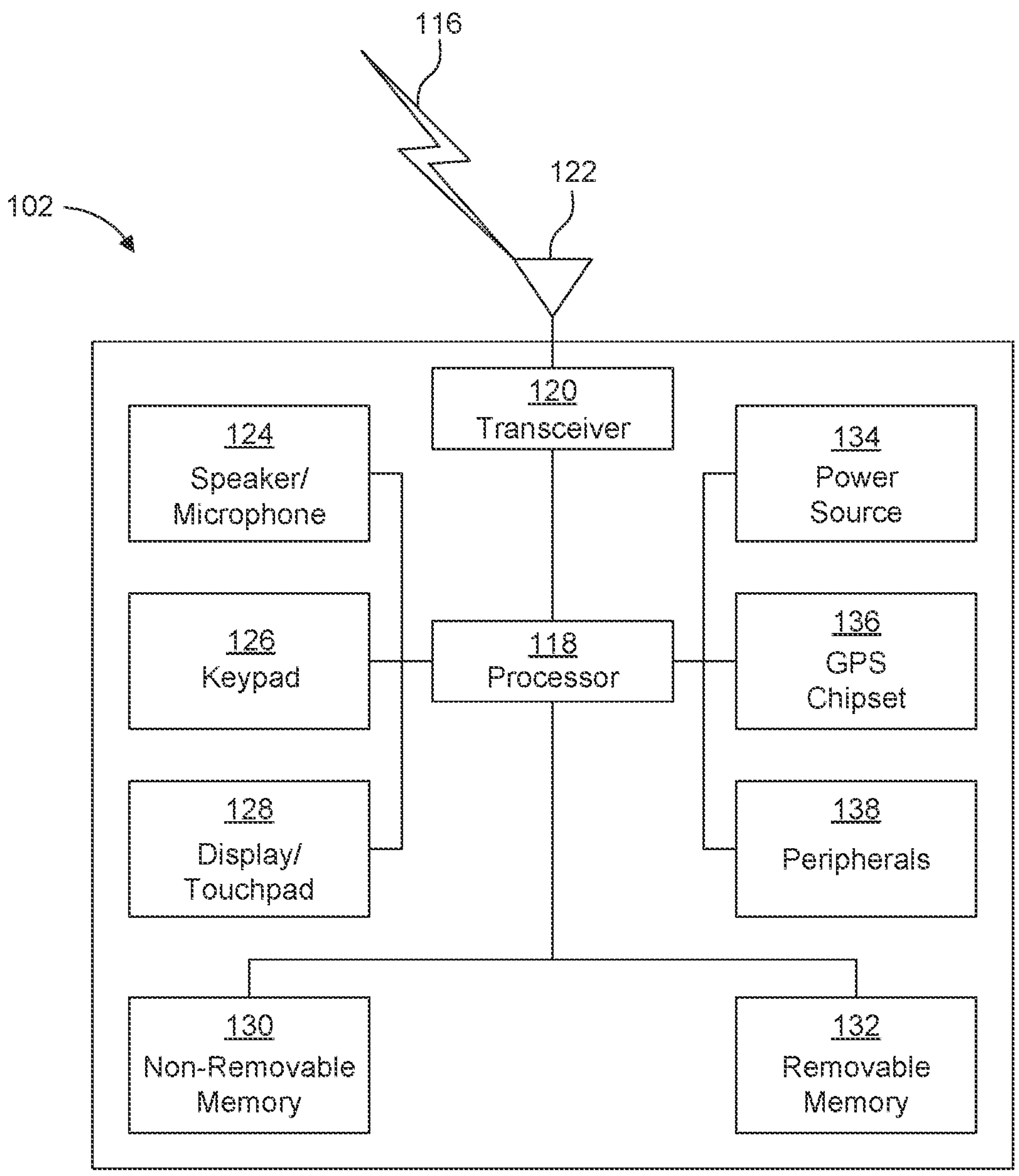
FIG. 1B is a system diagram illustrating an example wireless transmit/receive unit (WTRU) that may be used within the communications system illustrated in FIG. TA.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other elements/peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together, e.g., in an electronic package or chip.

The transmit/receive element 122 may be configured to transmit signals to, or receive signals from, a base station (e.g., the base station 114*a*) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. For example, the WTRU 102 may employ MIMO technology. Thus, in an embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other elements/peripherals 138, which may include one or more software and/or hardware modules/units that provide additional features, functionality and/or wired or wireless connectivity. For example, the elements/peripherals 138 may include an accelerometer, an e-compass, a satellite transceiver, a digital camera (e.g., for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a virtual reality and/or augmented reality (VR/AR) device, an activity tracker, and the like. The elements/peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the uplink (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the uplink (e.g., for transmission) or the downlink (e.g., for reception)).

Figure 1C:
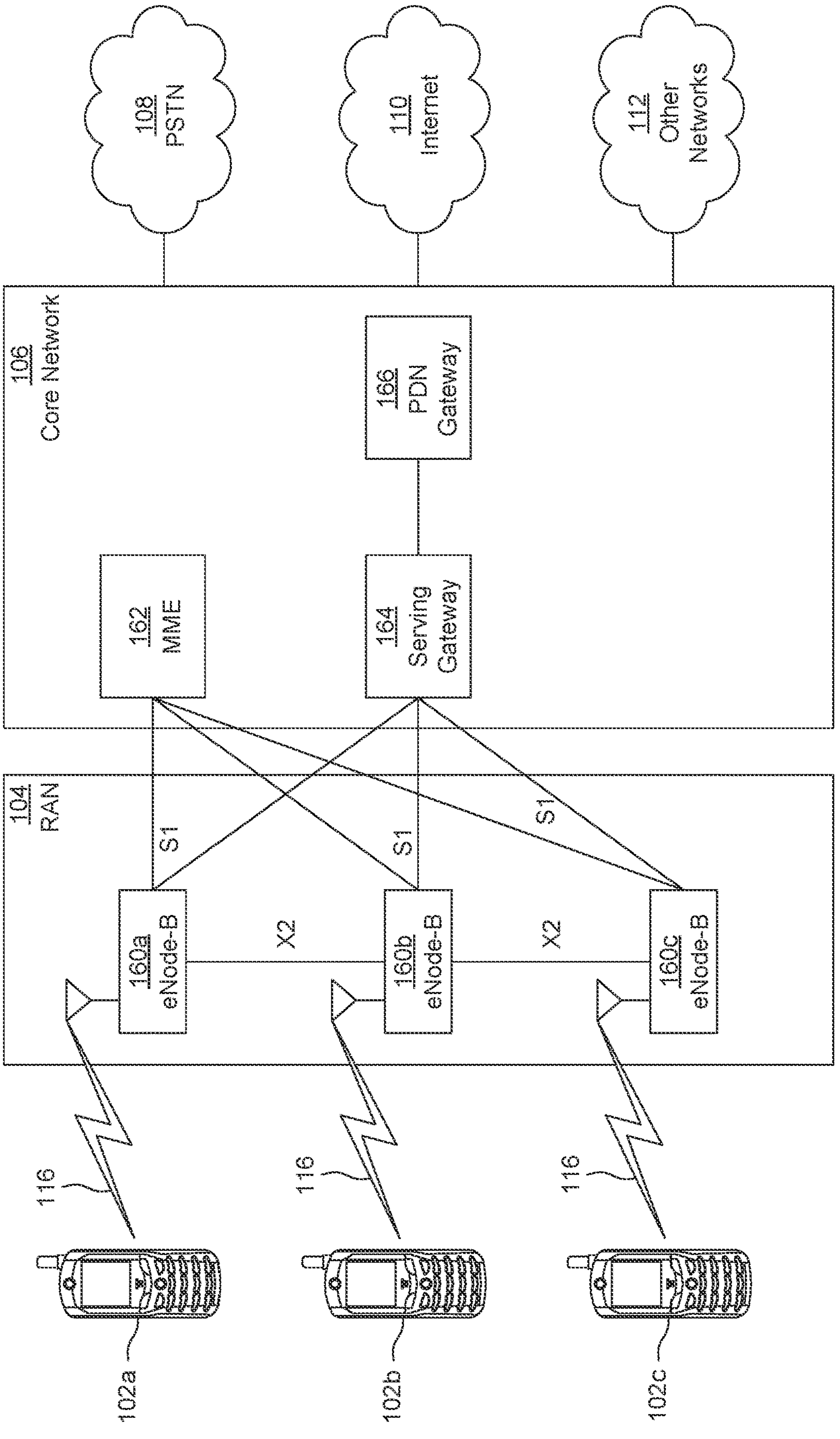
FIG. 1C is a system diagram illustrating an example radio access network (RAN) and an example core network (CN) that may be used within the communications system illustrated in FIG. 1A.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, and 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In an embodiment, the eNode-Bs 160*a*, 160*b*, 160*c* may implement MIMO technology. Thus, the eNode-B 160*a*, for example, may use multiple antennas to transmit wireless signals to, and receive wireless signals from, the WTRU 102*a*.

Each of the eNode-Bs 160*a*, 160*b*, and 160*c* may be associated with a particular cell (not shown) and may be configured to handle radio resource management decisions, handover decisions, scheduling of users in the uplink (UL) and/or downlink (DL), and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (PGW) 166. While each of the foregoing elements are depicted as part of the CN 106, it will be appreciated that any one of these elements may be owned and/or operated by an entity other than the CN operator.

The MME 162 may be connected to each of the eNode-Bs 160*a*, 160*b*, and 160*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode-Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode-B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in infrastructure basic service set (BSS) mode may have an access point (AP) for the BSS and one or more stations (STAs) associated with the AP. The AP may have an access or an interface to a distribution system (DS) or another type of wired/wireless network that carries traffic into and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier sense multiple access with collision avoidance (CSMA/CA) may be implemented, for example, in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High throughput (HT) STAs may use a 40 MHz wide channel for communication, for example, via a combination of the primary 20 MHz channel with an adjacent or nonadjacent 20 MHz channel to form a 40 MHz wide channel.

Very high throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse fast fourier transform (IFFT) processing, and time domain processing, may be done on each stream separately. The streams may be mapped on to the two 80 MHz channels, and the data may be transmitted by a transmitting STA. At the receiver of the receiving STA, the above-described operation for the 80+80 configuration may be reversed, and the combined data may be sent to a medium access control (MAC) layer, entity, etc.

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV white space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support meter type control/machine-type communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or network allocation vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
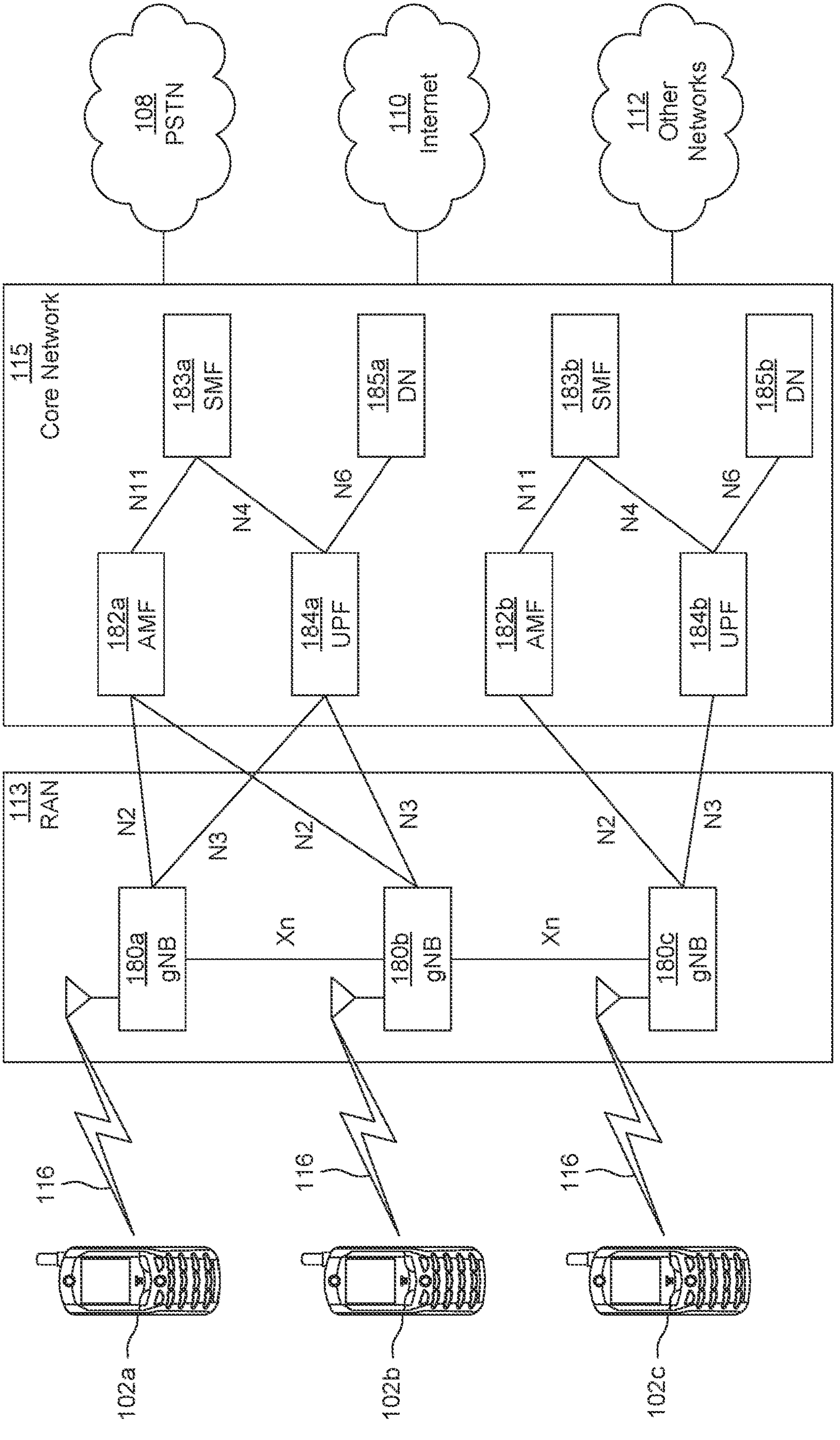
FIG. 1D is a system diagram illustrating a further example RAN and a further example CN that may be used within the communications system illustrated in FIG. 1A.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In an embodiment, the gNBs 180*a*, 180*b*, 180*c* may implement MIMO technology. For example, gNBs 180*a*, 180*b* may utilize beamforming to transmit signals to and/or receive signals from the WTRUs 102*a*, 102*b*, 102*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., including a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In anon-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards user plane functions (UPFs) 184*a*, 184*b*, routing of control plane information towards access and mobility management functions (AMFs) 182*a*, 182*b*, and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one session management function (SMF) 183*a*, 183*b*, and at least one Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of NAS signaling, mobility management, and the like. Network slicing may be used by the AMF 182*a*, 182*b*, e.g., to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, e.g., to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In an embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to any of. WTRUs 102*a-d*, base stations 114*a-b*, eNode-Bs 160*a-c*, MME 162, SGW 164, PGW 166, gNBs 180*a-c*, AMFs 182*a-b*, UPFs 184*a-b*, SMFs 183*a-b*, DNs 185*a-b*, and/or any other element(s)/device(s) described herein, may be performed by one or more emulation elements/devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

INTRODUCTION

Unless otherwise stated, SL Tx, SL Tx UE, Tx UE, Tx device, and Tx are used interchangeably herein.

Unless otherwise stated, SL Rx, SL Rx UE, Rx UE, Rx device, and Rx are used interchangeably herein.

Unless otherwise stated, primary direction, intended direction of transmission, and primary direction of transmission are used interchangeably herein.

Unless otherwise stated, UE and device are used interchangeably herein.

Device-to-Device (D2D) communication has been a center of attention for a long time. 3GPP standardized its first version of D2D communication in Release 12 for proximity services. Later in Release 14, 3GPP standardized LTE V2X (Vehicle-to-everything) based on the 4G LTE cellular standard. This underwent further feature enhancements within 3GPP Release 15.

In parallel, 3GPP standardized the baseline for 5G cellular standard new radio (NR) in Release 15. 5G NR has been standardized with a very flexible and forward-looking design. It comes with plenty of advanced functionalities, like for example flexible numerologies, advanced design for the control transmission, bandwidth part, configurability of transmission and HARQ (Hybrid Automatic Repeat Request) related parameters. The first sidelink (SL) standard was provided in 3GPP Release 16, so called NR Sidelink, which has been built over the NR Uu foundational features and framework. Sidelink here refers to direct data communication between the devices without data passing through the network. The resource allocation in sidelink supports two different flavors that respectively enable sidelink operation for devices which are in-coverage of a cell and devices out of coverage.

3GPP technical report (TR) 22.886 and technical specification (TS) 22.186 present a comprehensive description of the NR V2X use cases and requirements which become the basis for NR SL work in Rel-16. The use cases are divided in the following four groups; see TR 22.886 and M. H. C. Garcia et al., "A Tutorial on 5G NR V2X Communications," In IEEE Communications Surveys & Tutorials, February 2021:

1) Vehicles Platooning: Includes use cases for the dynamic formation and management of groups of vehicles in platoons. Vehicles in a platoon exchange data periodically to ensure the correct functioning of the platoon. The inter-vehicle distance between vehicles in a platoon may depend on the available QoS.
2) Advanced Driving: Includes use cases enabling semi-automated or fully-automated driving. Vehicles share data obtained from their local sensors with surrounding vehicles in proximity. In addition, vehicles share their driving intention in order to coordinate their trajectories or maneuvers, thus increasing safety and improving traffic efficiency.
3) Extended Sensors: Enables the exchange of sensor data—either raw or processed—collected through local sensors between vehicles, Road Side Units (RSUs), devices of pedestrians, and V2X application servers. The objective is to improve the perception of the environment beyond the perception capabilities of the vehicles' own sensors.
4) Remote Driving: Enables a remote (tele-operated) driver or a V2X application to operate a vehicle. The main use cases are for passengers who cannot drive themselves, for vehicles located in hazardous environments (e.g., construction areas or locations with adverse weather conditions), and for complex situations in which automated vehicles are unable to drive safely.

The physical layer structure for the NR V2X SL is heavily based on the Rel. 15 NR Uu design. In addition, the physical layer procedures for the NR V2X SL reuse some of the concepts of Rel. 14 LTE V2X, with the introduction of additional procedures for providing physical layer support for unicast and groupcast transmissions. Although both frequency ranges are supported in NR V2X sidelink, the design of NR V2X sidelink has been based mainly on the lower frequencies of FR1. For NR V2X sidelink, no specific optimization is performed for the higher frequency range of FR2, except for addressing phase noise which is more prominent at higher frequencies.

Transmissions in NR V2X SL use the orthogonal frequency division multiplexing (OFDM) waveform with a cyclic prefix (CP). The sidelink frame structure is organized in radio frames (also referred to simply as frames), each with a duration of 10 ms. A radio frame is divided into 10 subframes, each with a duration of 1 ms. This physical structure is basically aligned with 5G NR Uu structure standardized in Rel. 15.

3GPP Release 16 provides two designs for sidelink resource allocation; see "A Tutorial . . . " already mentioned and TS 38.214. For devices in-coverage of a cell, SL resource allocation can be done by the gNB, which is called Mode 1 based resource allocation. SL devices can also perform autonomous resource allocation based upon sensing themselves the resources that have been made available for SL communication. This autonomous mode of SL resource allocation is called Mode 2 based resource allocation. In Mode 2, the SL devices perform sidelink resource allocation for their transmissions in an autonomous manner.

In NR V2X, SL power control is supported for PSCCH, PSSCH, PSFCH and S-SSB transmissions. As transmit power control (TPC) commands are not supported for NR SL, the SL power control scheme is open loop. For the SL power control, a maximum transmit power P_max is (pre-) configured at the Tx UE; see TS 38.214. SL power control is supported for unicast and groupcast transmissions in NR V2X.

For a unicast transmission, the PSSCH power control can be configured to use the DL pathloss PL_DL (between the gNB and Tx UE) only, the SL pathloss PL_SL (between Tx UE and Rx UE) only, or both DL pathloss PL_DL and SL pathloss PLSL. The PSSCH power control can be based on the DL pathloss PL_DL when the Tx UE is in network coverage. This allows mitigating the interference at the gNB (for uplink reception), like the SL power control in LTE V2X. If the PSSCH power control is based on the DL pathloss only, Tx UEs near the gNB transmit over the PSSCH at a lower power than Tx UEs farther away from the gNB. The DL pathloss-based PSSCH power control can be enabled or disabled by the gNB. The DL pathloss can be derived at the Tx UE based on measurements of reference signals (e.g., Channel-State Information Reference Signals, CSI-RS, or SSB) transmitted by the gNB.

For unicast, the PSSCH power control can also be based on the SL pathloss PL_SL between the Tx UE and the Rx UE. This allows compensating for the attenuation in the SL channel. For instance, a Tx UE that is far away from the gNB may transmit over the PSSCH at a larger power than necessary when the PSSCH power control is configured to use DL pathloss only. However, if the PSSCH power control takes the SL pathloss also into account, this may avoid that a Tx UE transmits at a large power. The SL pathloss-based PSSCH power control can be used when the Tx UE is in or out of network coverage. The SL pathloss-based PSSCH power control can be enabled or disabled via (pre-)configuration. For this power control scheme, the Tx UE requires an estimate of the SL pathloss that can be obtained from feedback of the Rx UE; see TS 38.214. Based on PSSCH DMRS (Demodulation reference signal) transmitted by the Tx UE, the Rx UE can obtain an average reference signal received power (RSRP) over several RSRP measurements in order to mitigate fluctuations on the received power; see TS 38.215. The Rx UE cannot derive the SL pathloss based on the RSRP measurements since the transmit power of the PSSCH DMRS is not indicated to the Rx UE; see "A Tutorial . . . ". Thus, the Rx UE feeds back the average RSRP to the Tx UE using higher layer signaling. The Tx UE may use the fed back average RSRP along with the average transmit power of the PSSCH DMRS to derive the sidelink pathloss PL_SL (in dB) as follows:

$$\text{PL\_SL} = \text{Average } Tx \text{ power } PSSCH\ DMRS \text{ (in dBm)} - \text{Average } RSRP \text{ at } Rx\ UE \text{ (in dBm)}$$

When the PSSCH power control is configured to use both the DL pathloss and the SL pathloss, the transmit power for PSSCH is determined at the Tx UE as follows (in dBm):

$$\text{p\_ssch} = \min(\text{P\_max}, \text{P\_plDL\_Legacy}, \text{P\_plSL\_Legacy});$$

$$\text{P\_plDL\_Legacy} = \text{P\_0DL} + 10 * \log\_10\,(2^{\wedge}u * \text{M\_pssch}) + \text{a\_DL} * \text{PL\_DL}$$

$$\text{P\_plSL\_Legacy} = \text{P\_0SL} + 10 * \log\_10\,(2^{\wedge}u * \text{M\_pssch}) + \text{a\_SL} * \text{PL\_SL}$$

where the second term P_p1DL_Legacy and third term P_p1SL_Legacy in the argument of the min expression of the $1^{st}$ equation are power values derived from the DL pathloss and the SL pathloss, respectively. The power control parameters are (pre-)configured separately when considering the DL pathloss and SL pathloss: P_0DL and a_DL are associated with the DL pathloss and P_0SL and a_SL are associated with the SL pathloss. u is the SCS configuration factor of the configured numerology. M_pssch is the number of PRBs for the PSSCH (in symbols without PSCCH). If the sidelink power control is not based on the DL pathloss or the SL pathloss, then the second or the third term, respectively, is not included in the argument of the min expression. As mentioned before, SL pathloss-based PSSCH power control is only supported for unicast transmissions. In case both the DL pathloss and SL pathloss are disabled for the PSCCH power control, the transmit power for PSSCH is equal to the (pre-) configured maximum transmit power P_max.

For transmissions with two streams over PSSCH, the PSSCH transmit power is equally shared between the two streams. The expression in the above equation represents the PSSCH transmit power for PSSCH symbols without PSCCH. In NR V2X, a Tx UE transmits over PSSCH and PSCCH with the same power spectral density (i.e., with the same power over a PRB) in all symbols with PSCCH, PSSCH or PSCCH/PSSCH. With M_pscch PRBs used for transmission over PSCCH, there are M_pssch−M_pscch PRBs available for PSSCH in a PSCCH/PSSCH symbol. Based on this, the PSSCH transmit power P_pssch_i and PSCCH transmit power P_pscch in the initial symbols carrying both PSCCH and PSSCH is given by (in dBm):

$$\text{P\_pssch\_i} = \text{P\_pssch} + 10 * \log 10\left[\,(\text{M\_pssch} - \text{M\_pscch})/\text{M\_pssch}\,\right]$$

$$\text{P\_pscch} = \text{P\_pssch} + 10 * \log 10\left[\,\text{M\_pscch}/\text{M\_pssch}\,\right]$$

For a groupcast transmission, the PSSCH power control can be configured to use the DL pathloss. SL pathloss-based PSSCH power control is not supported for groupcast in NR V2X. For groupcast PSSCH power control based on SL pathloss, Rx UEs need to feed back their RSRP to the Tx UE, which can lead to a large overhead as all of the Rx UEs need to feedback RSRP to the Tx UE. This may result in diminishing gains or even that the feedback overhead exceeds the advantage.

For a UE transmitting PSFCH, the PSFCH power control can be based on the pathloss between the gNB and the UE (i.e., the DL pathloss) if the UE is in network coverage. While using the SL pathloss may avoid transmitting at a power larger than necessary, SL pathloss-based PSFCH power control is not supported in NR V2X.

For a sidelink UE transmitting sidelink synchronization sequence block (S-SSB), and serving as synchronization reference (SyncRef) UE, the S-SSB power control can be based on the pathloss between the gNB and the SyncRef UE (i.e the DL pathloss) if the SyncRef UE is in coverage. The S-SSB power control parameters associated with the DL pathloss are configured separately from the PSSCH or PSFCH power control parameters. In case the SyncRef UE is out of network coverage, the SyncRef UE sends S-SSBs with the (pre-)configured maximum transmit power P_max.

The primary/paired Sidelink Control Information (SCI) transmission/reception scheme includes a SCI transmission scheme and a sensing scheme for autonomous SL resource allocation which jointly can result in significant performance improvement over legacy schemes where transmission and sensing only take place in the direction of transmission.

The two main flavors of primary/paired transmission/reception schemes will now be presented.

TDMA Primary/Paired SCI Transmissions

In this flavor, when a SL Tx transmits over SL, the SCI (e.g., the first stage SCI) is transmitted in the intended direction of transmission (0° transmission) and then subsequently in the direction opposite to the intended direction of transmission (180° transmission). However, the SL data transmission (e.g., over PSSCH) is only performed in the intended direction of transmission. Herein, the expressions "primary direction" and "paired direction" will be used for the intended direction of transmission and the direction opposite to the intended direction of transmission, respectively. The two transmissions are realized in sequence as the SL device uses the antenna panel or set of antennas in a different direction for the two transmissions.

Further, the sensing of SCI for resource allocation purpose is neither omni-directional (legacy SL design) nor only in the intended direction of transmission. Rather, a potential transmitter performing autonomous resource allocation performs SCI sensing in (i) the intended direction of transmission, and (ii) the direction paired with the intended direction of transmission. The SL device performing sensing will know the sequence for primary and paired SCI transmissions as described and will thus adapt its receive beams accordingly. The SL devices are assumed to be capable of performing sensing in primary and paired directions simultaneously.

When a SL Tx performs sensing based autonomous resource allocation for its upcoming SL transmissions and performs this sensing in the intended transmission direction and in the paired direction, it can receive a majority of transmissions with which its transmissions may have collision risk.

Parallel Primary/Paired SCI Transmissions

A key observation for highly directional systems is that only (almost) collinear transmissions are detrimental from a collision perspective and need to be considered while performing sensing for SL autonomous resource allocation.

In this flavor, the SCI (e.g., the first stage SCI) transmissions in the primary and the paired direction are conducted simultaneously, requiring that the SL devices are capable of such transmissions. As an example, this can be possible when SL devices are equipped with more than one antenna panel.

The sensing of SCI for resource allocation purpose is neither omni-directional (legacy SL design) nor only in the intended direction of transmission. A potential transmitter performing autonomous resource allocation performs SCI sensing in the primary as well as in the paired direction of transmission. This flavor requires that the SL UEs can receive SCI simultaneously in the paired directions. As SL devices typically are vehicle mounted, they can be equipped with multiple antenna panels and thus easily fulfil this requirement.

When a SL Tx is performing sensing based autonomous resource allocation for its upcoming SL transmissions and performs this sensing in the intended transmission direction and in the paired direction, it can receive a majority of transmissions with which its transmissions may have collision risk.

However, for sidelink communication, there is no closed loop power control; only open loop power control is supported. Sidelink power control can be based upon the pathloss estimation of the DL pathloss or sidelink pathloss. A sidelink Tx can be configured to use the DL pathloss or SL pathloss or both to compute its transmit power to a given SL Rx. In the absence of any SL or DL based power control configuration, a SL Tx will transmit with maximum SL power.

The conventional power control design has some limitations. When no SL or DL pathloss compensation is configured, a SL Tx will transmit with maximum power. This leads to increased interference for others, and energy inefficient transmissions. When SL pathloss is compensated, the power control is oblivious to potential interference levels that a SL transmission will face, and thus a SL Rx may not be able to decode the packet when there is interference on the overlapping sub-channels (despite the pathloss compensation). When DL pathloss is configured to be compensated, it is sub-optimal as DL pathloss is completely oblivious to how much power is required for the sidelink. This means that in some cases, SL Tx may transmit with high power which is not needed for successful detection at SL Rx. In other cases, it may transmit with low power dictated by DL pathloss, which may result in packet error at SL Rx.

Further, the highly directional nature of at least some sidelink transmissions has certain implications on signal propagations and needs to be incorporated in the power control mechanisms for signal energy and interference energy computation.

Another limitation of conventional sidelink power control is that when multiple transmissions use a given time-frequency resource, there is no mechanism to prioritize the sidelink transmissions with higher priority. This may then result in interference situations which degrade the performance of higher priority sidelink transmissions leading to poor system operation.

It can thus be seen that it can be desired for the SL power control mechanisms to overcome at least some of the limitations of the conventional solutions, for example so that SL communication becomes more reliable and energy efficient. It can also be possible to make SL systems provide higher Key Performance Indicators (KPIs) to higher priority sidelink transmissions even when the SL systems are highly loaded. The present principles overcome at least part of the limitations of the conventional solutions.

Priority-Conscious Interference-Aware Power Control for Sidelink Transmissions

This embodiment proposes a power control procedure for sidelink transmissions intended to address the shortcomings in the current power control design. The proposed design is conscious of the priority of the sidelink transmission, e.g., the priority of the data/traffic of the sidelink transmission, and aware of the interference that the current transmission may face at the target receiver. This embodiment shows how a SL Tx can prepare relevant interference measures while operating under Mode 1 or Mode 2 based resource allocation, then provides a design for priority-conscious interference-aware transmission power determination. Variants of the main solution are also outlined, and the configuration setup is provided for the proposed power control.

For directional transmissions, a SL Tx will transmit to its intended SL Rx. The direction from a SL Tx to its intended SL Rx will, as already described, be termed as “primary direction”. Another set of directions is associated with a given primary direction at a given SL Tx such that the transmissions of other transmitting devices received from these directions may interfere with the SL Tx transmission in its primary direction to its target SL Rx. Such a set of directions will be referred to as “paired direction”. A typical example of paired direction is the direction which is 180° opposite to the primary direction. However, due to variable beamwidth transmissions, side lobes, back lobes, the location aspects such as the presence of reflecting surfaces at/around a given location, the paired direction may comprise additional directions.

Basic Principle

According to this embodiment, a SL Tx transmits an SL transmission for which transmission power is determined with the intention to compensate for the pathloss and the estimated interference at the target receiver. A key idea is to compensate the estimated interference received by the intended SL Rx so as to increase the probability of successful detection. However, if all the devices in a vicinity increase the transmission power to compensate for estimated interferers, the noise plus interference floor will be raised, which can mean that the SL receivers receive a higher signal power and also higher interference power, which can lead to no effective improvement in received signal-to-interference-and-noise-ratio (SINR) and also to saturation levels in the system. To avoid this detrimental event, further according to the embodiment, each SL Tx determines the transmission power to compensate for the pathloss and for only the interferers having a priority lower than a priority of its own transmission.

This priority conscious interference cancellation can be applied to D2D communication/systems in various regimes of operation. These systems may be operating at FR1 frequencies below 6 GHz, at FR2 up to 52.6 GHz, FR2-2 up to 71 GHz or future extensions which may target sub-THz or THz systems.

In addition to priority, an aspect is the determination of interferers that are going to impact the intended receiver device(s). The determination of interfering transmissions depends heavily on the operating frequency. As an example, a D2D system operating in FR1 (sub 6 GHz frequencies) may potentially be using omni-directional transmissions, and thus all the transmissions in the vicinity using the overlapping time-frequency resource will reach the target Rx device and will add to its received interference. In such a system, a Tx device will then consider all the interfering transmissions, estimate their transmission powers at the target Rx and perform priority based interference cancellation. As another example, for a system operating in FR2 and performing directional transmissions, interfering transmissions should be considered with the directionality aspect that may incorporate direction, beamwidth and even antenna radiation patterns. These devices operating in FR2 may also utilize quasi-omni antenna patterns. In addition, the devices may be equipped with multiple antennas and antenna panels in different directions, which will provide each SL Tx reception of potential interfering transmissions from several directions. For this example, a SL Tx while performing the proposed power control solution will consider all the estimated (e.g., measured) interfering transmissions from all the directions, and down-select a subset of the interfering transmissions which will be received at the target Rx according to the Tx knowledge (e.g., measured by the Tx) of interfering transmissions' directions, the location of target Rx, beam related aspects including beamwidth and antenna patterns etc. This will be further described in "Obtaining Relevant Estimates in Mode 1" and "Obtaining Relevant Estimates in Mode 2" hereafter.

After applying its knowledge of these aspects to get the subset of interfering transmissions that the Rx will receive, a SL Tx can apply priority based interference cancellation.

While this description targets vehicular devices for ease of understanding, it should be noted that the present principles are general and fully applicable to a variety of devices involved in D2D communication. As an example, the present principles are fully applicable to handheld devices like smartphones, tablets and devices which may be worn by humans, like virtual reality headsets/head-mounted-displays or glasses. For each different category of devices, a SL Tx may have additional knowledge about the device categories, such as the number of antenna panels with which these devices are typically equipped and their typical radiation patterns. This information is then used by a SL Tx to determine which transmissions are going to impact (i.e., hit) the target receiver and it applies this knowledge to determine interfering transmissions. Thus, for the different nature of systems and devices, the relevant information may differ, though the present principles remain applicable and valid for enhanced power control transmissions.

Preparing Relevant Estimates in Different SL Modes of Operation

Obtaining Relevant Estimates in Mode 1

In Mode 1, the gNB performs resource allocation for SL Tx devices. Nevertheless, a SL Tx decodes the sub-channels to decode the transmissions that other UEs are transmitting towards this SL Tx. The SL Tx can maintain a sliding window for the detected reservations and the power estimated for these reservations. In addition to the decoded interferers, a SL Tx can also maintain the received signal strength indicator (RSSI) estimates. Strictly speaking, this sliding window for power control characterization can be maintained only for the resource pools which are configured as transmit resource pools for this SL Tx.

It will later be described that there can be a need to differentiate RSRP estimates for decoded SCIs (and RSSI values as energy/interference indicator) as a function of whether these SCI are primary SCIs (e.g., which is simply SCI in case of 3GPP Release-16 based SL design) or paired SCI transmissions [first stage SCI transmitted in the direction which is paired with the primary direction of transmission, as already described]. Another differentiation can be made on the basis of whether the SL Tx received them through the similar antennas/beam-direction that it uses to transmit to its intended SL Rx or whether the receive beam direction is paired (e.g., 180° opposite) to the primary beam direction. The notion of receiving through the same receive beam can be described more precisely using the notion of beam correspondence. In that respect, receiving an SCI through a primary direction means that the SL Tx receives an SCI through a receive beam having beam correspondence with its transmit beam which it uses to transmit in its primary direction of transmission to its intended SL Rx.

Devices using such a highly directional sidelink may be equipped with a variable number of antennas or antenna panels, which may be fixed in different physical directions. In addition, as a given SL Tx may be communicating with more than one SL Rx, it may need to use the interferers as part of its interference aware power control. Thus, it makes sense that a SL Tx maintains the directions along with decoded SCIs indicating future reservations.

Another way to maintain such directions can be to maintain these moving windows of decoded SCIs (along with primary and paired indictor as used in paired SCI transmission/reception based SL communication) for each receive direction. This receive directions can be associated with each receive antenna, each receive antenna panel, each receive beam, or each receive beam of each receive antenna panel. This can then allow simpler processing when a SL Tx intends to transmit to a target Rx, as it can extract the useful interfering reservations which are meaningful to the intended direction of transmission.

Obtaining Relevant Estimates in Mode 2

In Mode 2, a SL Tx can perform sensing based resource allocation and maintain a sliding window of detected SCIs and their powers over its configured transmit resource pools. This is already needed for SL Tx to perform its resource allocation, but this data can be further processed to obtain suitable parameters for the interference compensation for its SL transmission. The SL Tx can also maintain RSSI estimates over the sub-channels in the sliding window used for resource allocation. This can be helpful for interference compensation for its transmissions.

Estimating Interference Metrics at SL Tx

As will be described, a SL Tx can estimate the potential interference metrics reflecting the interference that its transmission will encounter in a number of ways. The estimate of interference then allows a SL Tx to use an appropriate amount of transmission power, which increases the chances of successful detection at the target recipient(s). Some ways are direct and provide a reliable measure of interference, namely RSRP from decoded SCI with indication of future reservation overlapping with the selected resource. Some ways, namely RSSI estimate over the allocated sub-channels, RSRP thresholds of resource allocation and CBR, are indirect measures of interference, but these measures go up with increased interference in the system. Thus, the different measures can be used individually or in a suitable combination with suitable weights to compute the transmit power such as to compensate the interference at the SL Rx.

Direct Interference Metrics (e.g., RSRP from Decoded SCIs)

The most accurate direct measure of interference comes from the decoded SCIs where SCIs provide the indication of future reservation with time and frequency indication where this future reservation will be transmitted.

There is a set of interferers (and future reservations) for which an SL Tx will be able to decode the SCIs. For these SCIs indicating reservations on the resources where a SL Tx will transmit, the decoded transmissions will serve as interference to the SL Tx transmission. As the SL Tx has decoded these reservations, it has RSRP estimates for these transmissions.

A better estimate of interference that a given SL transmission will face at a given SL Rx can be made at that SL Rx, thus Tx knowledge of potentially interfering transmissions can be improved by having feedback from the target Rx. Different mechanisms enable this feedback from the intended Rx.

For the cases where intended SL Rx knows a priori a scheduled resource, for example for the case of periodic transmissions, it can estimate the interfering transmissions and their powers for its intended reception. For configured grant transmissions or transmissions with future reservations indicated there are scenarios where a SL Rx gets to know a priori the SL resources in future where it will be the intended destination for SL transmissions. Then SL Rx can feed an indication of these interfering transmissions and their powers to its Tx. These indications can be provided to the SL Tx through suitable signaling, for example in the form of physical, MAC or RRC level signaling. The SL Tx can in turn use this information to apply suitable power control so as to ensure successful detection of its transmission at the intended SL Rx.

Apart from directly indicating the interferers, a SL Rx can provide useful indication which can help estimating the interference at the SL Rx. As an example, the number of receive antennas, receive beamforming parameters, the capability to sophistically null out or cancel the received interferers, etc. can all be useful parameters that can help a SL Tx choose suitable transmission power for this target SL Rx device in the face of interference. Such signaling can for example be provided to the SL Tx during the sidelink RRC_Active configuration setup between a SL Tx and a SL Rx. Such signaling could also be part of PSSCH configuration.

Tx Power Indication in the SL Transmission

A SL Tx or a SL Rx can also generate an interference estimate as follows. The transmit power can be indicated as part of SL control information. This indication then provides the knowledge of the transmit power to all the devices decoding this SCI. The indication of transmit power can be suitably quantized. The indication can be added in first stage SCI or 2nd stage SCI. This knowledge can then be used to determine the pathloss of this transmission which can allow the location determination of its transmitting device combined with angle estimation and beam measurement algorithms. This implies that where each SL Tx indicates its current transmit power as part of control information, the devices able to decode this control information can process and estimate the location of the transmitting device. The estimation will be more accurate for highly directional systems due to strong line of sight and minimal multipath. Combining this knowledge of interfering Txs locations and the location of target SL Rx, a SL Tx of interest can determine the interference levels that each interfering Tx will cause at its target SL Rx. This helps the SL Tx to perform transmit power control to compensate for the interference that its transmission will encounter (i.e., face) at the target recipient.

Indirect Interference Metrics (e.g., RSSI, CBR, HARQ Feedback)

The direct interference metrics typically provide an accurate view of which future transmissions are going to interfere with a given scheduled resource. Nevertheless, in many cases this information may not be available. A possible reason is that a transmission can be sent without explicit indication of reservation. Another possible reason is that the Tx is unable to decode the reservation if transmitted, which can happen due to many reasons such as for example channel fades and directionality aspects. It turns out that a SL Tx can estimate and maintain a number of indirect interference measures which can provide valuable information about the situation at the target SL Rx. Some of these measures are discussed in the following: RSSI over the scheduled sub-channels In case of absence of decoded SCIs or as a complement, a SL Tx can maintain the RSSI estimates over the sub-channels. When it selects a set of sub-channels for its SL transmission (Mode 2) or the gNB has allocated it (Mode 1), it can check the (past) RSSI estimates for the allocated sub-channels and their relative RSSI values compared to the RSSI of the resource pool. As an example, if the RSSI of the target sub-channel is higher (e.g., much higher) than the average RSSI of the resource pool, it may indicate the presence of external noise or interference which may potentially be a different RAT if the operation is not over the licensed carrier. The RSSI and its relative strength in the resource pool can be used to appropriately choose the suitable transmission power.

RSRP Thresholds from Resource Allocation Procedure

When a SL Tx is performing autonomous resource allocation, if there are not enough candidate resources available at the end of resource identification phase, it increases the RSRP thresholds (which are associated with a given SL transmission priority and each detected (potential interferer) transmission priority) and runs the resource identification phase again. A SL Tx will keep increasing the RSRP thresholds unless it sees at least a configurable number of candidate resources. The increase in RSRP thresholds leads to ignoring the transmissions/reservations but some of them will eventually serve as interferers to the target transmission. Thus, the increase in RSRP threshold (number of iterations done to perform resource allocation) is a direct indicator of the interference level that the transmission from SL Tx will face. The increase in RSRP thresholds thus provides a direct indication of expected interference power and can thus be used as a mechanism to control the SL transmission power to compensate the expected interferences.

Channel Busy Ratio (CBR)

A SL Tx maintains and monitors channel busy ratio (CBR) as part of resource allocation over a sidelink. This measure is used for autonomous congestion control purpose over the sidelink. This measure provides an indication of the utilization ratio of sub-channels over the sidelink. The higher CBR, the higher probability that the transmissions will face interference. Thus, these measures can be incorporated as part of the SL transmission power control to overcome adverse effects of increased interference.

HARQ Feedback from the Target SL Rx

For SL transmissions with some form of HARQ feedback, be it ACK/NAK based or NAK only scheme, the status of past HARQ feedback from a given SL Rx can be a useful indication to modulate transmission power control for this SL Rx. If a SL Tx receives a NAK or a given number of consecutive NAKs from a SL Rx, this typically means that the SL Rx is not receiving enough signal energy to allow successful detection, and the transmit power should be increased to have a higher probability of successful detection. On the other hand, if a SL Tx receives a given number of consecutive ACKs from a given SL Rx, that typically means that the SL Rx is decoding data correctly and there may be an opportunity to lower the transmit power while still keeping the successful detection at SL Rx. The reduction in transmit power is helpful for two reasons. It improves the energy efficiency of SL Transmissions and also increases the SL Tx battery life. On a network level, if several or all SL Txs adjust transmit power, overall noise plus interference levels stay contained. If there is no mechanism to reduce the transmit power, all the Txs will keep on increasing the transmit power based upon increase in the noise plus interference floor, making the network interference limited.

Feedback of Indirect Measures from the Target SL Rx

A target SL Rx can provide an indication of estimates of indirect interference measures made locally at this target SL Rx. These indirect measures can be in the form of RSSI estimates as seen at the target Rx for the scheduled sub-channels, or average RSSI for the resource pool. This can also comprise of CBR or other indirect measures for which estimates were made directly at the target Rx and sent back to the SL Tx in appropriate form.

Hybrid Combined Metric

In practice, a SL Tx is able to decode some SCIs, but not all. In this case, a single metric solely based upon detected SCIs or solely based upon RSSI will not have the complete picture of the interference at the target Rx. In that respect, a hybrid scheme can be applied at the SL Tx to estimate the interference that will actually be compensated through proposed power control.

An example hybrid interference metric can be the one where SL Tx takes into account the RSRP values from decoded SCIs and considers the RSSI contribution from potentially other interferers (after having settled the contributions of decoded SCIs). There could be a weighted consideration of RSRP thresholds and the RSRPs from the detected SCIs in addition. These factors thus lead to choosing a transmit power such that the best knowledge of each level of interference is incorporated as part of transmit power control. Another example can be the combination of RSRP from decoded RSRPs and the HARQ feedback values from the target SL Rx. Yet another example can be the RSRPs from decoded SCIs, RSSI and CBR with suitable weights in the power control procedure. These weights are elaborated further in the later part of this embodiment. In another variation, RSRPs from decoded SCIs can be combined with HARQ feedback values and estimated CBR for transmission power determination.

Computing SL Interference Measures at Target SL Rx

Direct and indirect key metrics through which a SL Tx estimates locally the interference that its future transmission will see at the target recipient(s) have been described. However, the detection performance typically depends upon the interference seen at a SL Rx, not as seen by a SL Tx. Ways for a SL Tx to derive the interference estimate at SL Rx using the locally available estimates and using other information like location, direction of Rx or other parameters about a SL Rx which it may have the knowledge of will now be described. One of these ways here incorporates direct feedback from a SL Rx indicating the interference as perceived/estimated at a SL Rx.

Projecting the Interference Metrics at Target SL Rx

Applying Tx interference as is at SL Rx

A basic way includes assuming that the estimated interference at the SL Tx is directly applicable at the intended SL Rx. This way can be useful when the SL Tx does not have a (reliable) estimate of the SL Rx position or direction, which makes it hard to do the projection of Tx perceived interference to the Rx location.

Estimation Based Upon Distances

In case the SL Tx has an estimate of distance of SL Rx, it can estimate whether the interference will increase or decrease at the SL Rx. Thus it can compute the estimated interference value at the SL Rx for each interfering SL Tx that it has been able to decode, and which indicates the reservation of overlapping SL resource. This is done individually as the different interferers may be located at different distances, directions and angles, thus the interference seen at the intended Rx undergoes a unique shift for each interfering Tx.

In some SL transmissions, a SL Tx will add its zone identity which helps estimating its location. This can be useful for a SL Tx performing power control for interference compensation. A SL Tx can maintain the zone identities for SL Txs that it has been able to decode and can use this information to do the estimation of relative distance between an interfering device and the target SL Rx.

Estimation Based Upon Cones of Operations

SL Tx can estimate the direction of interference for each decoded SCI. It also knows the direction of the intended SL Rx. Based upon this knowledge, it can prepare the cones of operations for the detected interferers and can estimate whether the interference will increase or decrease at the SL Rx. This also takes into account the direction in which SL Rx will beamform to receive from SL Tx. Thus it can compute the estimated interference value at the SL Rx for each interfering SL Tx that it has been able to decode, and which indicates the reservation of overlapping SL resource. This needs to be done individually as the different interferers may be located at different distances, directions and angles, thus the interference seen at the intended Rx will undergo a unique shift for each interfering Tx.

Augment with Feedback from Intended SL Rx

The interference estimate that a given SL transmission will face at a given SL Rx can be improved having knowledge of potentially interfering transmissions from the Rx. This feedback can be provided from the intended Rx in different ways.

For the cases where intended SL Rx knows a-priori the scheduled resource, for example for the case of periodic transmissions, it can estimate the interfering transmissions and their powers for its intended reception. For configured grant transmissions or transmissions with future reservations indicated are the scenarios where a SL Rx gets to know a-priori the SL resources in future where it will be the intended destination for SL transmissions. Then SL Rx can feed an indication of these interfering transmissions and their powers to its Tx. SL Tx can in turn use this information to apply suitable power control so as to ensure successful detection of its transmission at the intended SL Rx.

Apart from directly indicating the interferers, a SL Rx can also provide useful indication which can help estimating the interference at the SL Rx. For example, one or more of the number of receive antennas, receive beamforming parameters, and the capability to sophistically null out or cancel the received interferers can be useful parameters and can help a SL Tx choose suitable transmission power for this target SL Rx device in the face of interference.

Incorporating Beam/Directionality Aspects for Interference Estimation

When a sidelink system operates over very high frequency carriers, SL devices (Tx and Rx) transmit and receive through highly directional narrow beams. The narrow beams transmission/reception with beamforming from multiple antennas (antenna panels) is required in such systems to compensate for the diminishing aperture and reduced signal energy that each antenna receives.

An important consequence of such highly directional transmissions is that a transmission among a pair of SL devices gets hit by an interfering transmission only if the other pair is (almost) collinear to the first pair. This happens because a SL Tx beamforms to its intended SL Rx, and SL Rx receives through a narrow beam aligned to its SL Tx. Given this, it is possible to consider only the interfering transmissions that are from collinear SL devices for compensation. Other transmissions among non-collinear devices that a SL device may be receiving, thanks to distributed antennas or antenna panels, are irrelevant for compensation as the intended SL Rx will not be receiving them through the same beam as it uses to receive the target transmission from its SL Tx.

Priority-Conscious Interference-Aware Power Control for Primary/Paired SCI Transmission/Reception Based Scheme An important objective of distributed SL power control is to find a trade-off between increasing transmission power to compensate for estimated interference (and SL pathloss) at the target Rx and the increased interference that the transmission will generate for overlapping transmissions at neighboring devices. If all devices try to compensate for the estimated interference, with time all the devices will tend to overshoot to compensate the increased interference. The ultimate result will be the whole network transmitting at saturation power levels, and each receiver will encounter an interference limited situation, likely leading to a large number of erroneous packets and poor network efficiency.

A possibility is to compensate for the SL pathloss and then balance between power compensation (cancelling the detected interferers by increasing power) and interference reduction for neighbors (reducing own transmission power to reduce the interference to others). When a SL Tx performs enhanced power control, it would be judicious to incorporate the priority of its own transmission, priority of estimated interfering transmissions, and the priority of transmissions with which the transmission will interfere. Two factors hinder knowledge of how the own transmission will affect the others. The first is the physical restriction that in a distributed system of devices, a SL Tx may not know the receiver locations/channels to estimate how its transmission will hit them. A second is that if such interference compensation at neighboring receivers is incorporated, this may require a reduction in the own transmission power such as to not being able to compensate properly the pathloss/interference making correct decoding difficult.

However, it is possible to apply the power control to compensate for the interference with respect to the relative SL priority of the own transmission versus the priority of the interfering transmission. It is in particular possible to compensate for the interference received by the intended SL Rx so as to increase the probability of successful detection. As has been described, if a plurality of devices in a given vicinity increase the transmission power to compensate for the estimated interferers, this will raise the noise plus interference floor. The result can be that each SL Rx gets both a higher signal power and a higher interference power, leading to no net improvement in received SINR and leading the system to saturation levels. To avoid this detrimental event of the devices increasing the transmission power systematically, it is proposed that each SL Tx increases the transmission power to compensate for only interferers having a priority lower than the priority of the own transmission.

As already noted, for highly directional systems the interfering transmissions are the ones among the pairs of devices which are (at least almost) collinear to each other. This results in systems where an increase in the power of a given SL Tx (Tx) to compensate for the transmission from another interfering SL Tx (Tx-I) may result in increase of interference at intended receiver of Tx-I, Rx-I. Thus, if both devices increase their power to compensate for each other's transmission, the receivers see no benefit in their effective SINRs. To that end, SL priority-conscious interference-aware power control-based compensation provides interference compensation only for higher priority transmission, thus prioritizing the higher priority transmissions. A typical result is that higher priority transmission gets decoded, while lower priority transmissions may not succeed. On the other hand, in the legacy system where no interference compensation is performed and the power control is only based on pathloss, both transmissions may fail because of the lower SINR resulting from the presence of interference at respective receivers. Similarly, if both SL devices compensate the estimated interference independent of SL priorities, both SL Txs increase their transmission powers, leading to increased signal power and increased interference power for both receivers. The net result of increase in signal power and interference power is again a poor SINR at each receiver. In such a case, typically both transmissions will fail, as in the legacy case where no interference compensation is performed.

It is assumed that the SL Tx transmits SL SCI (e.g., first stage SCI) in the primary direction (toward the intended SL Rx, called as primary SCI) and in the paired direction (which can be the 180 degrees opposite to the primary direction, called paired SCI). The paired direction SCI transmission and reception serve to alleviate the interfering transmissions which happen frequently among collinear SL devices for highly beamformed transmissions.

Figure 2:
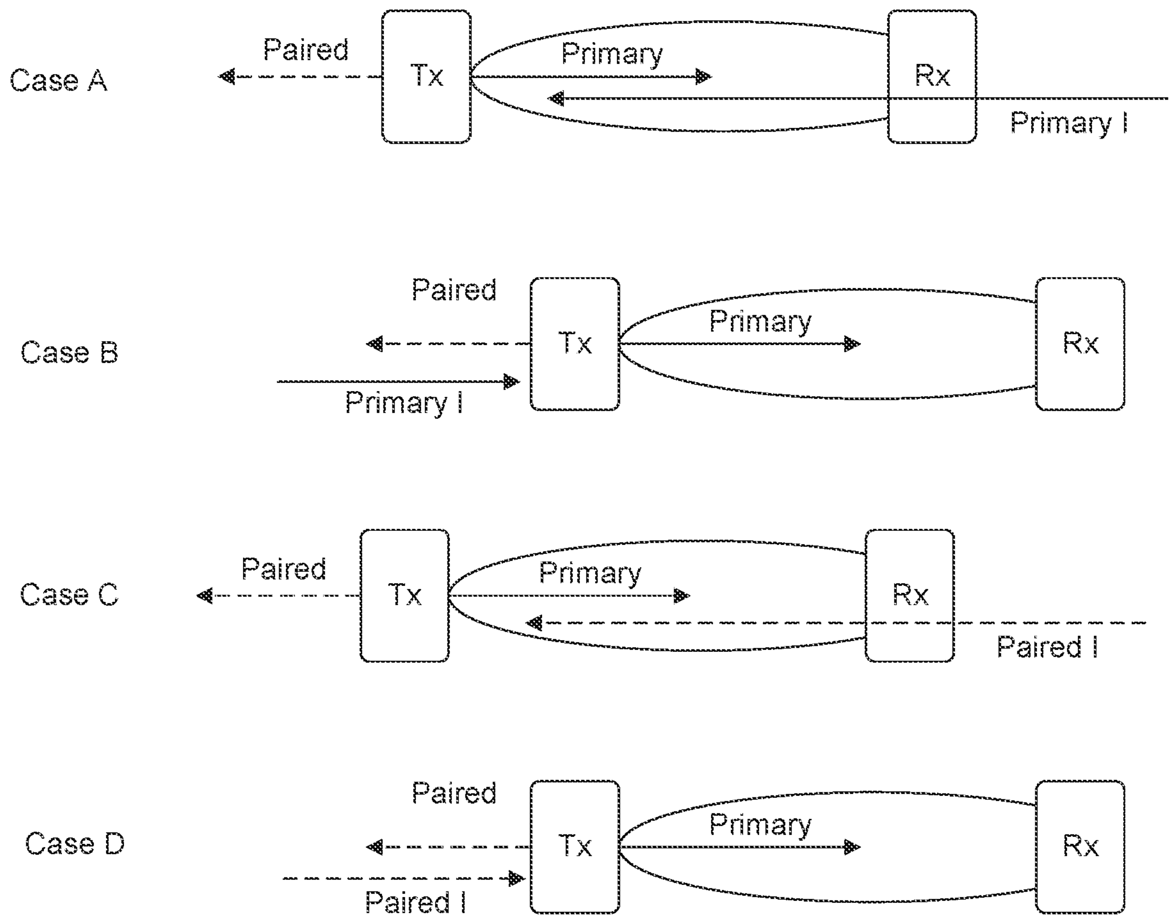
FIG. 2 illustrates different cases of a sidelink (SL) transmitter (Tx) with interfering transmissions detected.

As discussed, the interfering transmissions of concern are only from (almost) collinear devices for which intended SL Rx will receive energy while trying to receive data from intended SL Tx. FIG. 2 illustrates different cases of a SL Tx with interfering transmissions detected:

Primary SCI received through its primary direction (Case A)

Primary SCI received through its paired direction (Case B)

Paired SCI received through its primary direction (Case C)

Paired SCI received through its paired direction (Case D)

It should be noted that for each primary SCI received from one direction, the Tx knows that the paired direction will be in the opposite direction. Similarly, for each interfering paired SCI received in one direction, the Tx knows that the primary direction of interfering transmission will be in the opposite direction. It can thus be concluded that Case A (Primary SCI received from the primary direction of transmission) will not be harmful, since the two transmissions are in opposite directions and for receivers' beamforming to their intended Txs, such transmissions will not hurt. This holds true also for Case D (paired SCI received in the paired direction); the Tx of the interfering transmission will transmit opposite to the direction of target Tx/Rx pair. Thus, for interference compensation purposes both Case A and Case D can be excluded from power control consideration. The cases of main interest are thus Case B (primary SCI received through paired direction) and Case C (Paired SCI received through primary direction).

Figure 3:
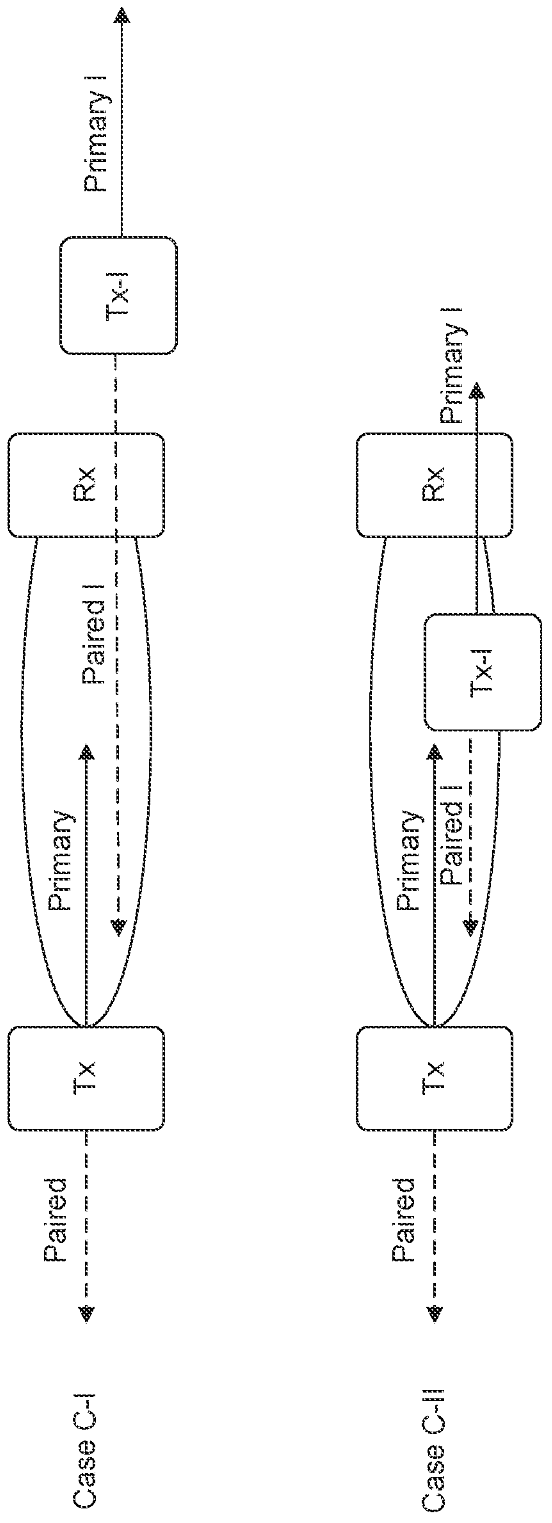
FIG. 3 illustrates two possibilities of a first case in FIG. 2.

FIG. 3 illustrates two possibilities of Case C. In one possibility, Case C-I, if interfering Tx lies away from Rx, it will not hurt the Rx when interfering Tx, denoted as Tx-I, transmits in its intended direction of transmission. In the other possibility, Case C-II, the transmitter of interfering transmission is located in the middle of the target pair, Tx and Rx. In this case, when interfering device Tx-I transmits to its receiver, this creates interference at the intended receiver Rx. Nevertheless, the Tx (the target transmitter) only receives a given amount of power but given channel fading and other perturbations it cannot estimate the exact location of the interfering transmitter. Thus, it cannot establish with certainty whether or not Tx-I's transmission (in the primary direction) is going to hurt the reception at the intended Rx. On the other hand, any increase of transmission power at Tx in order to compensate the interference power from Tx-I will hurt the intended receiver of Tx-I. As can be seen, compensating for the interfering transmissions of Case C is useful in some scenarios and but not in others from the perspective of target receiver Rx. On the other hand, this compensation is always harmful from the perspective of the interfering pair. Hence, in a variant, no power compensation is applied to Case C scenarios.

Figure 4:
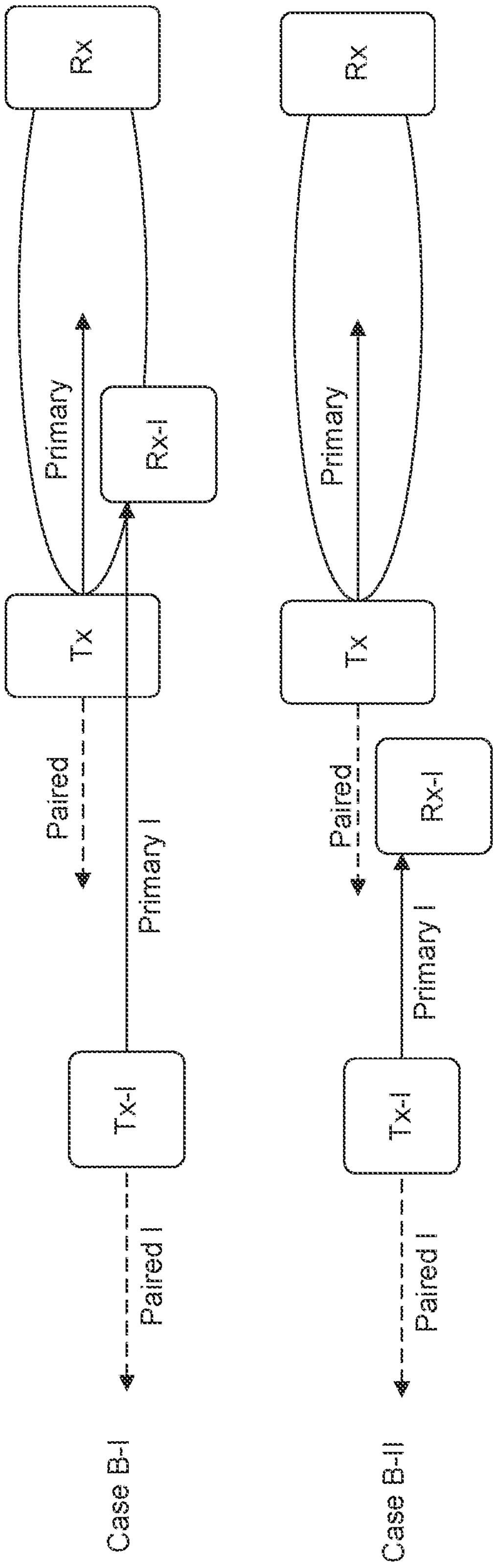
FIG. 4 illustrates two possibilities of a second case in FIG. 2.

FIG. 4 illustrates two possibilities of Case B in which the interfering transmission is harmful for the intended receiver Rx. This is true independent of how far or close the interfering transmitter is located to the left of Tx (in the Figure). Depending on the distance, the interference power will get modulated but will always be harmful. Case B can also be analyzed with respect to whether the receiver of interfering transmitter Tx-I is located to the left of Tx (in the Figure) or in the middle of target pair Tx and Rx. Case B-I shows the scenario where Rx-I is located between the target pair, Tx and Rx. The transmissions from both Tx and Tx-I hurt each other's receivers. In Case B-II, Rx-I is located to the left of Tx. Then Rx gets hurt by the interference generated by Tx-I, whereas Rx-I does not receive any interference when Tx transmits to its intended receiver Rx in its primary direction. Nevertheless, independent of the location of Rx-I, Rx will receive the interference generated by Tx-I. Thus, this is proposed that for the purpose of priority-based interference compensation, only the interfering transmissions are compensated for which SL Tx receives the primary SCI in its paired direction of transmission.

Transmission Power for SL Data

If a SL Tx is configured with nominal SL Tx power of P_0SL, transmits using numerology 'u', and intends to transmit over the PSSCH using M_pssch PRBs, a SL Tx configured to use at least SL pathloss for power control can compute its transmission power as follows:

$$P\_pssch = \min(P\_max, P\_plDL\_Legacy, P\_plSL\_Legacy); \text{ and}$$

$$P\_plDL\_Legacy = P\_0DL + 10*\log\_10\left(2^{\wedge}u*M\_pssch\right) + a\_DL*PL\_DL$$

$$P\_plSL\_Legacy = P\_0SL + 10*\log\_10\left(2^{\wedge}u*M\_pssch\right) + a\_SL*PL\_SL$$

where the P_p1DL_Legacy vanishes if not configured to use DL PL for power control.

For the proposed priority-conscious interference-aware power control, a SL Tx uses the information of direct interference metrics (decoded SCIs) and indirect interference metrics as proposed in this embodiment. Supposing that a SL Tx intends to transmit a SL transmission with priority p_i to a SL Rx with a given primary direction. Following the above description, a SL Tx only considers the interfering transmissions for which it receives the primary SCI through its paired direction. This paired direction is opposite to the primary direction where SL Tx transmits to reach its target SL Rx. This represents the case B in FIG. 2. From this set of direct interfering transmissions (SCIs decoded at SL Tx or SCI decoded at Rx and fed back to SL Tx), supposing a set PC-IA represents a subset of overlapping transmissions for which priority p_j is lower than the priority of own transmission p_i. These interfering transmissions are then used in the proposed power control to be compensated at this SL Tx. Thus, the SL Tx computes the power from SL PL as follows:

$$P\_plSL = P\_0SL + 10*\log\_10\left(2^{\wedge}u*M\_pssch\right) + a\_SL*PL\_SL + 10*\log\_10\ [SUM\_j\ (bj*IF\_SL\_Dec\_j)]$$

where IF_SL_Dec_j∈PC-IA represents the set of Low-priority Primary SCIs detected in Paired Directions (Case B)

This can then be plugged into the following equation to compute the transmission power for PSSCH:

$$P\_pssch = \min(P\_max, P\_plDL\_Legacy, P\_plSL)$$

Each contribution in the first summation term carrying IF_SL_Dec_j is the interference power of j-th decoded interferer at the SL Tx which is weighted by the coefficient bj to compensate its interference contribution at the SL Rx for the target transmission from SL Tx. These are thus primarily the RSRP values for interferers having priority lower than the own transmission whose primary SCIs have been decoded at SL Tx in its paired direction with future reservation indication colliding with the resource selected at SL Tx. The combined estimated interference contribution at the target Rx is converted from linear scale to dB scale to match the remaining terms in the equation.

Weight coefficient bj can be selected per interferer which can take into account the knowledge of the interferer (for example location, beam direction, number of overlapping sub-channels with the target transmission), SL Tx transmission parameters (transmit direction, beamwidth, target range) and the knowledge of the target SL Rx (for example location, direction, receive beamforming parameters). In this way, the weight coefficients bjs may also absorb the transformation of Tx local interference estimates to the target SL Rx. In the case of Rx providing an estimate of Rx estimated interferers, they will also appear here with appropriate weighting coefficients. The weighting coefficients for Rx indicated interferers don't need to incorporate the projection factor from SL Tx to SL Rx, as they are directly estimated at a SL Rx and indicated back to SL Tx. In another example, weight coefficient bj may also take the priority of the jth interferer into account. For example, the lower the priority of the jth interferer, the higher the compensation (e.g., higher value of bj) may be selected. The association/mapping between the priority and the compensation factor (e.g., contribution to bj) may be configured to the SL UE, e.g., by the network/serving gNB for the in-coverage SL UEs and may be pre-configured for the out-of-coverage SL UEs.

If a SL Tx has been configured to use indirect interference metrics (either estimated directly at Tx and transformed or fed back from target SL Rx) as part of PC-IA power control algorithm, it can compute the transmission power resulting from SL PL (and interference metrics) as follows:

$$P\_plSL = P\_0SL + 10*\log\_10\left(2^{\wedge}u*M\_pssch\right) + a\_SL*PL\_SL + 10*\log\_10\left[SUM\_j(bj*IF\_SL\_Dec\_j) + SUM\_k(ck*IF\_SL\_NDec\_k)\right]$$

where IF_SL_NDec_k denotes k-th Indirect (Non-Detected SCIs) measure

Each contribution in the last summation term carrying IF_SL_NDec_k is the contribution from one of the interference estimation methods and corresponds to the interferers that SL Tx/Rx have not been able to decode. These terms thus capture indirection measures such as RSSI estimate at the allocated sub-channels. Other examples to consider this metric may be based on the CBR value for the resource pool or based on the increase in RSRP threshold values from their default configured values as a result of iterations performed at the SL Tx as part of resource allocation process. It should be noted that when RSSI value is measured and some of the strong interferers are decoded at the same sub-channel, the contribution of decoded interferers should be subtracted from the estimated RSSI value; otherwise, it would result in over-estimation of interferers at the sub-channel of interest. There is a factor of uncertainty with such measures of interferers. As the SL Tx has not been able to decode them, future reservations, or the possibility of future transmissions for these are not reliably known. This uncertainty can be reflected in the power control formula by appropriate choice of the weight coefficient ck. The weight coefficients can also be adapted as a function of which and how many of these measures are being employed to compute the transmission power. As an example, RSSI over the sub-channel and increase of RSRP thresholds from resource allocation are directly related. Thus, if multiple indirect values are used in power computation, the weight coefficients can be adjusted (lowered) accordingly.

The earlier provided transmit power computation equations ignore the explicit handling of noise power at the target receiver, which can be acceptable if the effective interference power exceeds significantly the receiver noise power. Nevertheless, a more accurate transmit power determination will add the estimated noise at the target receiver with the estimated interference metrics. If N_ref denotes the reference noise power at the intended SL Rx, the above equation can be written as $$P\_plSL = P\_0SL + 10*\log\_10\left(2^{\wedge}u*M\_pssch\right) + a\_SL*PL\_SL + 10*\log\_10[N\_ref + SUM\_j(bj*IF\_SL\_Dec\_j) + SUM\_k(ck*IF\_SL\_NDec\_k)]$$

The reference noise power N_ref can be part of the power control configuration. Either a specific value of N_ref can be provided directly to the SL devices to be used, or the value of reference noise figure can be provided to SL devices. They can then use the reference noise figure with other relevant parameters like carrier frequency, bandwidth, etc. to compute the value of reference noise power to be used in the transmit power computation. Although noise power is not shown explicitly for the remaining transmit power determination computations, that can be added with the interference as above to make the computation more precise.

Transmission Power for SL Data and Control Channels

For the initial symbols of a SL slot where a SL Tx will transmit first stage of SCI, in the form of PSCCH, and PSSCH carrying data and second stage SCI, considering that the number of PRBs used for transmission over the PSCCH is denoted by M_pscch, the power allocated to the PRBs where PSSCH is transmitted can be determined as:

$$P\_pssch\_i = P\_pssch + 10*\log\_10\left([M\_pssch - M\_pscch]/M\_pssch\right)$$

This equation practically keeps the same amount of power per symbol in the initial symbols carrying data over PSCCH/PSSCH as in the last symbols of SL slot carrying only data over PSSCH. In addition, for a symbol where both PSCCH and PSSCH are mapped (e.g., used for transmission), both are assigned the same power per PRB, thus each is assigned a fractional power in direction proportion to the fraction of PRBs it uses among the allocated PRBs. Thus, effectively the power spectral density is kept constant over the resource blocks throughout the SL slot.

The transmission power for PSCCH carrying first stage SCI can be derived from the description and formulae of PSSCH power. The power spectral density is kept the same among data and control, and thus a slight transformation of P_pssch_SL can provide the power of PSCCH as:

$$P\_pscch = P\_pssch + 10*\log\_10\left(M\_pscch/M\_pssch\right)$$

In the paired SCI transmission-based scheme, different transmission power can be selected for the primary SCI versus the paired SCI. For example, in an aggressive transmission scheme, the paired SCI may be transmitted with higher power to eliminate or decrease the interference from the other SL Txs that may reside on the left side of the SL Tx (as shown in FIG. 4). The power offset between the paired and primary SCI transmission may be configured to the SL UEs. The power offset may be associated with the SL Tx's transmission priority, where the association between the priority and the corresponding value of the power offset may be configured to the SL UEs. The configuration may be given the SL UEs for example, by the network for in-coverage UEs or may be pre-configured for the out-of-coverage UEs.

It should be noted that in certain cases, it could be advantageous to have different power levels for control and data to make the control information decodable in a larger area by increasing the power assigned to the control channel compared to the data channel.

Priority-Conscious Interference-Aware Power Control for SL Design of 3GPP Rel-16/17

This applies the present principles to the sidelink design as standardized in 3GPP Rel-16/17. Each SL Tx transmits SL SCI in the primary direction (toward the intended SL Rx). Nevertheless, most SL devices may be equipped with multiple antennas (or antenna panels) to cover the transmission/reception in multiple directions. These antennas allow the reception/sensing of transmissions from these directions, adding to the SL device's knowledge of network and ongoing transmissions. For a SL Tx intending to transmit in a given primary direction, there is a paired direction associated with the primary direction of transmission. The paired direction SCI reception serves to estimate the interfering transmissions which happen frequently among collinear SL devices for highly beamformed transmissions.

As already described, the interfering transmissions of concern are only from collinear devices for which intended SL Rx will receive energy while trying to receive data from intended SL Tx. So, for Case A and Case B, a SL Tx will have the following interfering transmissions detected:

- a SCI (e.g., SCI transmitted in the primary direction) received through its primary direction (Case A); and
- a SCI received through its paired direction (Case B).

A SL Tx can judge that Case A (SCI received from the primary direction of transmission) will not be harmful as the two transmissions are in the opposite directions and for the receivers' beamforming to their intended Txs. Then, the case of interest is Case B (SCI received through paired direction) that represents the scenario where the interfering transmission is harmful for the intended receiver Rx. This is true independent of how far or close interfering transmitter is located to the left side of Tx (in the Figure). It is thus proposed that, for the purpose of priority based interference compensation, only the interfering transmissions with lower priority are compensated for which SL Tx receives the SCI in its paired direction of transmission.

For the proposed priority-conscious interference-aware power control, a SL Tx uses the information of direct interference metrics (decoded SCIs) and indirect interference metrics as proposed. Supposing that a SL Tx intends to transmit a SL transmission with priority p_i to a SL Rx with a given primary direction. Following the previous description, a SL Tx only considers the interfering transmissions for which it receives the SCI through its paired direction. This paired direction is opposite to the primary direction where SL Tx will transmit to reach its target SL Rx. This represents the Case B. From this set of direct interfering transmissions (SCIs decoded at SL Tx or SCI decoded at Rx and fed back to SL Tx), supposing a set PC-IA represents a subset of overlapping transmissions for which priority p_j is lower than the priority of own transmission p_i. These interfering transmissions are then used in the proposed power control solution to be compensated for at this SL Tx. Thus, SL Tx computes the power from SL PL as:

$$P\_plSL = P\_0SL + 10*\log\_10\left(2^{\wedge}u*M\_pssch\right) + a\_SL*PL\_SL + 10*\log\_10[SUM\_j(bj*IF\_SL\_Dec\_j)],$$

IF_SL_Dec_j∈PC-IA set of Low-priority SCIs detected in Paired Directions (Case B).

This can then be plugged in the following equation to compute the transmission power for PSSCH:

$$P\_pssch = \min\left(P\_max, P\_plDL\_Legacy, P\_plSL\right).$$

Each contribution in the summation term carrying IF_SL_Dec_j is the interference power of j-th decoded interferer at the SL Tx which is weighted by the coefficient bj to compensate its interference contribution at the SL Rx for the target transmission from SL Tx. These are thus primarily the RSRP values for interferers having priority lower than the own transmission whose SCIs have been decoded at SL Tx in its paired direction with future reservation indication colliding with the resource selected at SL Tx. The combined estimated interference contribution at the target Rx is converted from linear scale to dB scale to match the remaining terms in the equation.

Weight coefficient bj can be selected per interferer which can take into account the knowledge of the interferer (for example location, beam direction, number of overlapping sub-channels with the target transmission), SL Tx transmission parameters (transmit direction, beamwidth, target range) and the knowledge of the target SL Rx (for example location, direction, receive beamforming parameters). In this way, the weight coefficients bjs may also absorb the transformation of Tx local interference estimates to the target SL Rx. In the case of Rx providing an estimate of Rx estimated interferers, they appear with appropriate weighting coefficients. The weighting coefficients for Rx indicated interferers do not need to incorporate the projection factor from SL Tx to SL Rx, as they are directly estimated at a SL Rx and indicated back to SL Tx. In another example, weight coefficient bj may also take the priority of the jth interferer into account. For example, the lower the priority of the jth interferer, the higher the compensation (e.g., higher value of bj) may be selected. The association/mapping between the priority and the compensation factor (e.g., contribution to bj) may be configured to the SL UE, e.g., by the network/serving gNB for the in-coverage SL UEs and may be pre-configured for the out-of-coverage SL UEs.

For 3GPP SL design, additional variations of power control determination as a function of whether indirect interference measures are configured to be used and available etc., can be derived directly exemplifying power control determination with primary/paired transmission scheme. Similarly for the initial symbols of SL slot where a SL Tx will be transmitting first stage of SCI, in the form of PSCCH, and PSSCH carrying data and second stage SCI, considering that the number of PRBs used for transmission over the PSCCH is denoted by M_pscch, the power allocated to PSCCH and PSSCH is split per symbol in direct proportion of their PRBs in the symbol. For a system where transmissions are quasi omni-directional, a SL Tx will consider all the received transmissions as potential interference at its target SL Rx and will apply the priority based cancellation to determine its transmit power.

Variations on Enhanced Power Control

As has been described, the present principles enable power control where a SL Tx determines transmission power as a function of transmission priority and interference awareness. The SL Tx monitors interference metrics, notably the decoded control information from neighboring devices indicating future reservations over resources overlapping with the selected (Mode 2) or allocated (Mode 1) sidelink resources. The SL Tx then performs interference compensation with the intent to compensate for the interference generated at the target Rx by the detected transmissions having indicated priority lower than its own transmission. This section provides a number of variants. The main scheme or the variants can be configured by the network in special cases.

Compensating for a Limited Number of Interferers within a Configured Power Margin In a variant, a SL Tx compensates for only N of the strongest low-priority interfering transmissions and the maximum power raised for such compensation is limited to be within P_raise_limit dB. Such a limit may be efficient from the network perspective. A reason is that a large increase in the power of a SL Tx may help its target SL Rx for packet detection but may also result in increased interference for other SL Rxs, degrading their probability of packet decoding. Thus, keeping the transmission powers within certain limits can help better maintain the system performance while keeping the priority perspective.

The number of interfering transmissions N and the power compensation limit P_raise_limit_dB are the configuration parameters. In one design, a SL Tx can be configured with a value of N to 2, such that only the two strongest low priority interferers are compensated for. Similarly, the additional power for interference compensation can be capped to be within 3 dB of the transmit power determined without interference compensation. The SL devices may have default values pre-configured for these parameters, and it is also possible for the network to configure suitable values. The values can be part of resource pool configuration. The values may be configured differently per priority level.

Compensating for High-Priority Interferers without Impacting their Quality

In a variant, a SL Tx compensates for the low-priority interfering transmissions and only a subset of high-priority interfering transmissions. The subset of high-priority interfering transmissions includes high-priority overlapping detected transmissions for which SL Tx is able to establish that their respective target receiving devices will not receive interference from its transmission. An example of this is similar to Case B-II illustrated in FIG. 4. In this case, if the SL Tx is able to establish the correct location of Rx-I, it knows that no matter its transmission power, Rx-I will not receive any interference because of its location and the directionality of the transmission. Thus, SL Tx can incorporate the interference compensation for an interfering Tx-I of Case B-II even if the interfering transmission is indicated with a priority not lower than the own priority of SL Tx. Thus the SL pathloss based enhanced transmission power for PSSCH can be:

P_plSL = P_0SL + 10 * log_10 (2^u * M_pssch) + a_SL * PL_SL + 10 * log_10 [SUM_j(bj * IF_SL_Dec_j) + SUM_k (ck * IF_SL_NDec_k) + //

Indirect (Non−Detected SCIs) measures

SUM_m (dm * IF_SL_Dec_HighPRIOm)] //

High *Prio* Interferers without impact on their target receivers where IF_SL_DEC_HighPriom denotes m-th high-priority interferer for which SL Tx power does not harm its target receiver and dm is the weight coefficient and // indicates the start of a comment as is the notation in MATLAB.

Compensating a Suitable Subset of Low-Priority Interferers from Case C

In a variant, a SL Tx compensates for the low-priority interfering transmissions of Case B and only a subset of low-priority interfering transmissions from Case C for which it can determine with high accuracy that its target receiver will be affected by this interfering transmission. The subset of low-priority interfering transmissions is comprised of low-priority overlapping transmissions for which SL Tx receives the paired SCI in its primary direction of transmission and for which it estimates that interfering Tx is located before its intended Rx (e.g., between the SL Tx and the intended SL Rx). An example of this is similar to Case C-II illustrated in FIG. 3.

Priority-Agnostic Interference-Aware Power Control

In a variant, all interfering transmissions are treated irrespective of their priorities. This does not limit the usage of suitable coefficients which could be a function of estimated power or other parameters. This variant could be suitable to other device to device communication systems where for example no physical layer priority indication is supported.

This power control can easily be implemented at SL Tx by skipping the described priority down-selection step applied to decoded interfering transmissions.

Transmission Power Relaxation to Avoid Network Saturation

In the priority-agnostic interference-aware power control, a SL Tx tries to estimate and compensate the interfering transmissions that its transmission may face. If a plurality of or all the devices are configured to perform the similar compensation, this may result in gradual increase of transmission powers leading to transmissions with saturated transmission powers, which is neither desirable nor effective from a system performance perspective. To avoid such overshoots of transmission power, it is possible to lower the transmission power of a given SL Rx if N of the past transmissions to this SL Rx were received correctly at this SL Rx.

For HARQ-based SL transmissions, the correct detection can be inferred from the HARQ ACK feedback received for those transmissions. This method can be very effective for HARQ enabled transmission to avoid saturation power levels. A suitable number N is part of the configuration to relax the transmission power. The reduction in the transmission power with N acknowledgements is also part of the configuration. As an example, an SL Tx can reduce its transmission power by 3 dB compared to the computed values if it receives 5 consecutive ACKs from the target Rx. This is by way of example and suitable values can be configured as part of power control algorithm.

For HARQ-less SL transmissions, other suitable techniques can be employed to overcome the saturated transmissions. The transmission power relaxation can be conditioned upon one or more of the estimated values of RSSI, CBR, and the determined transmission power. As an example, if past RSSI estimates over the selected subchannels show values higher than a pre-configured threshold, that may indicate that many devices are transmitting over these with higher power. In this case, if the SL Tx own computed transmission power also exceeds another pre-configured threshold, SL Tx may relax the final transmitted power x-dB compared to the computed power. The thresholds for RSSI, own Tx power, and the relaxation x-dB can be part of the power control configuration.

Transmission power relaxation, e.g., using the HARQ ACK/NAK history information, can be used along with the priority-conscious interference aware power control solutions. The reduction in the transmission power with N number of configured HARQ ACKs may be configured as an association with the priority of the SL Tx's transmission. For example, lower priority transmission may be configured to reduce the power by a larger amount compared to the higher priority transmission. A mapping between the priority and the power reduction factor may be configured to the SL UEs by the network/serving gNB for the in-coverage SL UEs and may be pre-configured for the out-of-coverage SL UEs.

Configuration for Enhanced Power Control

A SL Tx can be configured to perform enhanced power control in different ways. One aspect for enhanced power control algorithm is related to the configuration of the power control algorithm, and a second aspect is related to the choice of suitable weights for the variation of algorithm to be applied to the interference metrics to compute the final transmission power for the SL transmission. Different ways to perform the suitable algorithmic configuration and the weights determination are described in the following sub-sections.

Algorithmic Configurations

The network can configure SL devices with the enhanced power control algorithm to be used to compute its SL transmission power. This configuration can be part of pre-configuration that a SL device is provided with through its initial configuration. This configuration can be part of resource pool configuration. Thus, each resource pool configuration can have an indication as to which type of power control algorithm needs to be employed for transmission over this resource pool. As an example, the devices may be configured to use only interference aware variation of power control where transmission power is independent of relative priority of own transmission and the priorities of interfering transmissions. Another example is a configuration where a resource pool is configured with the power control variation of priority-conscious interference aware power control. Similarly, the devices may be configured with the size of the window to be used for interference metrics. For the devices operating in Mode 2, a suitable possible configuration can be to use the same size (history) of window for interference metrics as they use for resource selection. This can then simplify the processing at a SL Tx as the same window can be used in resource selection and power control processing. For the devices operating in Mode 1, the length of the window to estimate the interference metrics can be equal to the resource selection window of Mode 2. Nevertheless as the devices in Mode 1 are allocated resources by the gNB, a shorter window size can be configured to ease the transmit power control related processing.

For devices operating in Mode 1 of resource allocation with a gNB performing resource allocation, the gNB can update the power control configuration.

Determination of Coefficients for Interference Weightage

The description has provided formulae through which a SL Tx can compute the transmission power to compensate for the interference at a SL Rx. The weight coefficients play a role in modulating the transmission power as a function of estimates interferers or interference metrics.

The weight coefficients can be (pre-)configured by the network as part of power control parameters. The configuration can provide the combinations of weights corresponding to interferers and associated metrics to be utilized. In addition, the configuration can provide the indication how to modify the weights as a function of how many interferers or interference metrics are available to be utilized in the power control formulae. For example, if there are only two SCI decoded with overlapping transmissions, the coefficients b1 and b2 can have pre-configured values. These values can be configured to be different and smaller when there are 5 interferers decoded with overlapping transmissions. Thus, weight coefficients b1, b2, b3, b4 and b5 will have different values as a function of how many interferers get decoded.

Weight coefficients can be different as a function of relative priority between the own transmission and the interfering transmission.

Two (or multiple) sets of weight coefficients can be configured by the network for appropriate Rx type (interference capable or not). SL Tx may choose the suitable weight as a function of the type of intended SL Rx.

Different coefficients can be configured for different strategies. Active strategy is configured as part of configuration from one of the configured strategies. The network can update the active power control strategy and SL Tx will choose the appropriate method with suitable configured weights.

The sets of weights or weight determination methods for different power control algorithmic variants can also be provided as part of an initial configuration. One of these variants is configured as a default configuration, which can be different for different resource pools. The network can update and modify the active power control configuration for any set of resource pools, and the devices can use the weights and weight determination methods corresponding to the active configuration from the initial configuration where all relevant details are configured for all possible algorithmic variants.

Performance Evaluation of Proposed Scheme

Simulation Setup

For an evaluation, unicast SL communication wherein SL UEs communicate in pairs with one UE acting as Tx and the other as a Rx was simulated using the "NR V2X Highway" scenario that is a special case of the NR V2X Highway scenarios recommended by 3GPP in TR 37.885. The evaluation simulated a single-lane of a highway road of length 4 km with 100 SL vehicular UEs (50 Tx-Rx pairs). The vehicle positions and inter-vehicle distances followed the guidelines specified by the 3GPP in TR 37.885. For a Tx UE, the corresponding Rx UE was chosen randomly from the vehicles located within a distance of 150 m.

The carrier frequency of the simulated system was 28 GHz and a slot time of 0.25 ms was used which indicated a sub-carrier spacing (SCS) of 60 kHz. In the frequency domain, a maximum of 10 subchannels available for the SL and a subchannel size of 10 physical resource blocks (PRBs) was considered. A periodic traffic model was used, where a new packet arrives at each UE every X ms. The simulations provide results for X={5, 4, 3, 2, 1}ms. The packet size at each Tx UE was uniformly distributed between 1 to 10 subchannels. In a single run of the simulation, the packet size of a given Tx UE remained constant.

Directional transmission and reception of data (PSSCH) was assumed with a directional antenna of beamwidth 300 at both the Tx and Rx UEs. For directional sensing and directional transmission of SCI (PSCCH), the beamwidth was 300. Directional antenna gain was assumed to be equal to 5 dB for both the Tx and Rx UEs. The primary/paired SCI transmission/reception based SL communication strategy was simulated. In case of omnidirectional transmission and reception, no antenna gain was assumed.

Packet detection and decoding was based on the received SINR. For the data channel, the SINR threshold for successful reception of data was 10 dB as evaluated in R1-1908900 [LG Electronics, "R1-1908900: Discussion on Physical Layer Structure for NR Sidelink," 3GPP TSG-RAN WG1 Meeting 98, August 2019]. For the control channel, a 5 dB SINR threshold was used for decoding the received SCI. The same 5 dB threshold was applied while considering the set of received SCIs for the resource allocation procedure. The maximum power limit of a SL TX was fixed to 26 dBm.

Performance Results

This section compares the performance of the proposed power control scheme with 3GPP standardized power control performing the compensation of pathloss.

3GPP based power control scheme: A SL Tx UE is assumed to have distance estimation to its intended Rx UE which it can compute through measurements supported by NR SL. Knowing the distance, each SL Tx UE chooses the minimum power that results in a Signal-to-Noise Ratio (SNR) equivalent to data decoding threshold (10 dB). An interference margin of 5 dB is added to account for neighboring transmissions which are not known a-priori.

For the scheme according to the present principles, the scheme where SL Tx compensates the interference causing by all the lower priority transmission received through its paired direction was used.

Simulation results are averaged across 100 different distributions of SL UEs for the highway deployment scenario.

The results are presented from two aspects: System level performance results for packet reception ratio (PRR) average over all the devices, and 10-th percentile performance results focusing on the devices experiencing higher interference. 10-th percentile performance is analogous to the analysis of cell-edge user performance in cellular wireless communication systems, where the goal is to study the impact of a new solution on the users worst affected by interference.

Figure 5:
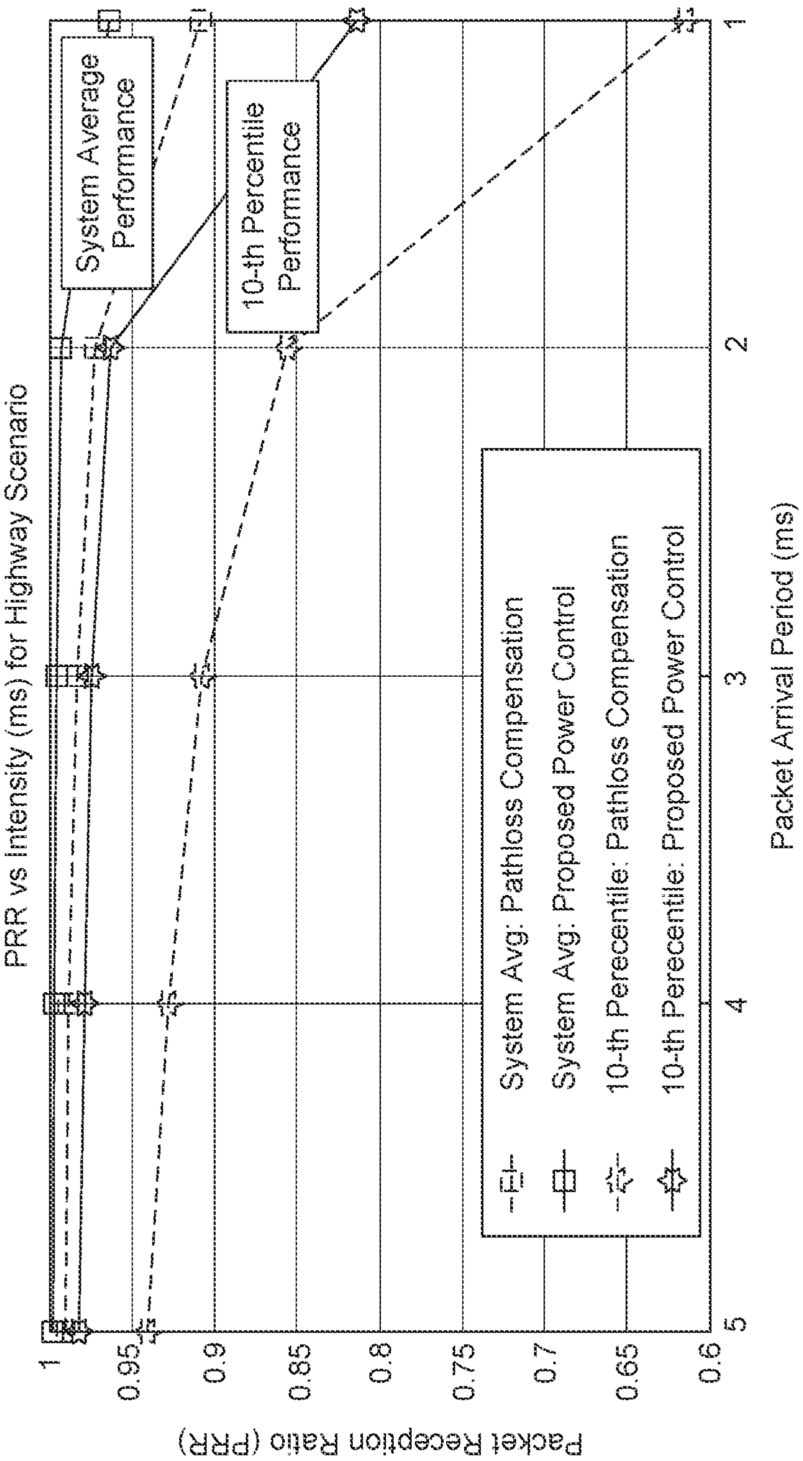
FIG. 5 illustrates results of an evaluation of the present principles.

FIG. 5 illustrates results of an evaluation of the present principles. The average packet reception ratio (PRR) is plotted on the y-axis against the traffic intensity which is indicated using the traffic arrival period on the x-axis. PRR is the fraction of packets received successfully without decoding errors at the intended SL Rx. For system wide average performance at packet arrival period of 1 ms, the PRR of the proposed power control scheme is 97% compared to the 3GPP power control solution which results in a PRR of 90.5%. For the 10-th percentile results, the improvement in PRR when using the proposed power control solution can be seen clearly. For 10-th percentile performance at packet arrival period of 1 ms, which leads to system being heavily loaded, the PRR of the proposed power control scheme is 81% compared to the 3GPP power control solution which results in a PRR of 61%.

The results demonstrate a clear technical advantage of the proposed power control solution over conventional solutions.

EXAMPLE EMBODIMENTS

Three example embodiments are described in the following subsections. The first example embodiment provides the general principle proposed to determine the SL transmit power, and the next two describe the SL transmit power determination in the context of directional SL systems where Tx UE is operating in Mode 2 and Mode 1 based resource allocation respectively.

General Priority Conscious Power Control

Figure 6:
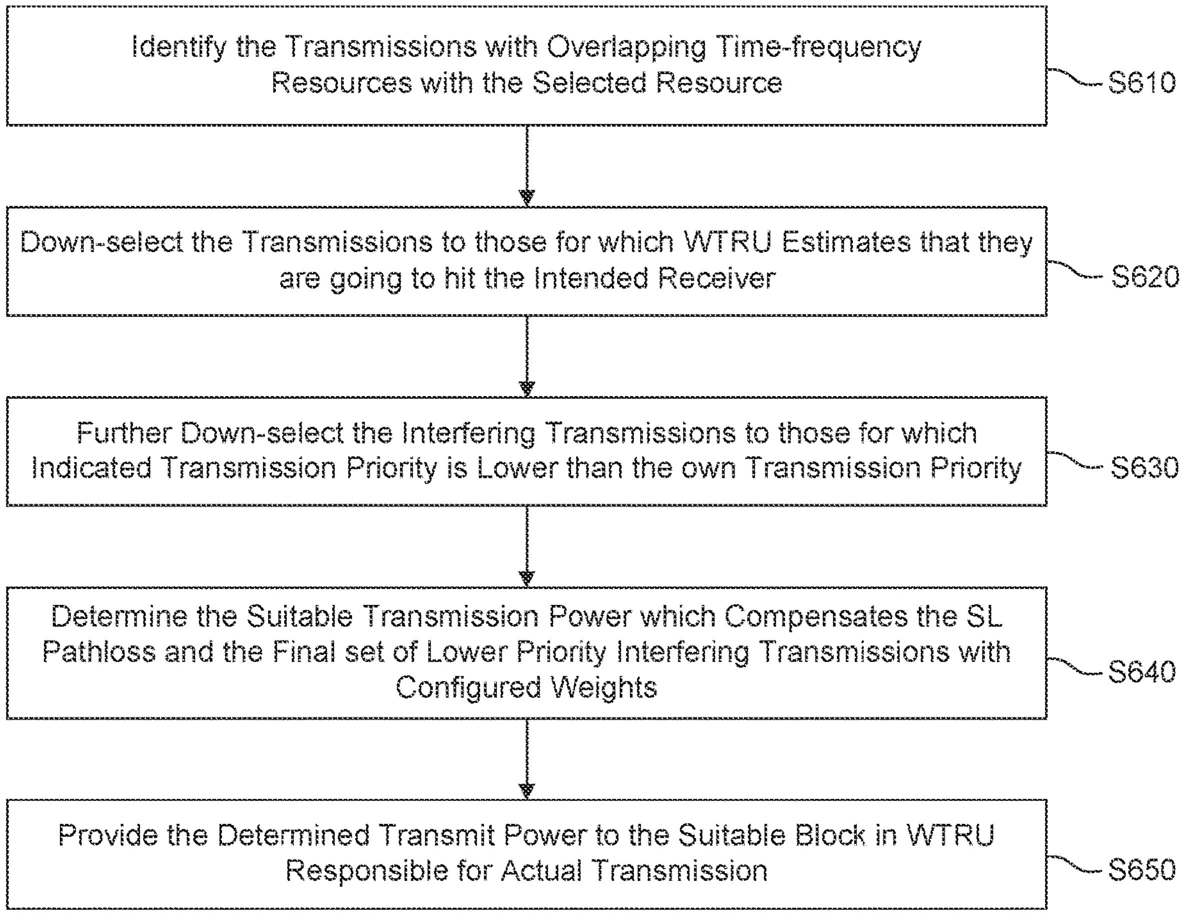
FIG. 6 illustrates transmit power determination in a first example embodiment according to the present principles.

FIG. 6 illustrates a first example embodiment according to the present principles that describes a method performed by a SL Tx to perform a SL transmission with enhanced power control for a unicast SL transmission. The SL Tx is configured to use at least SL pathloss for power control of PSSCH with suitable parameters.

The SL Tx obtains a packet for transmission over sidelink from higher layers and a suitable transmission resource for its SL transmission according to the configured resource allocation mode.

In step S610, the SL Tx identifies interfering transmissions having overlapping resources with its transmission resource.

In step S620, the SL Tx down-selects the interfering transmissions which are going to be received at the target SL Rx.

In step S630, the SL Tx further down-selects the interfering transmissions for which the indicated transmission priority is lower than the priority of own transmission.

In step S640, the SL Tx determines the SL transmission power for PSSCH and PSCCH in different symbols of SL slots according to the equations provided in this embodiment with the weights configured as part of the power control configuration.

In step S650, the SL Tx transmits over the PSCCH and PSSCH over the transmission resource with the determined transmit power.

The SL Tx can transmit over the PSCCH and PSSCH in the primary directions only if it operates according to 3GPP Rel-16/17 design.

The SL Tx can transmit over the PSCCH in the primary and paired directions and over the PSSCH in the primary directions only if it is configured to operate under primary/paired transmission scheme.

The SL Tx can track the resources in its transmission resource pools and maintain the RSSI and RSRP for the decoded SCIs.

The SCIs used to derive the interference can be primary SCIs, paired SCIs or both.

The SL Tx can use the knowledge of system operating frequency, default transmission modes, nature of transmissions being omni-directional or directional, knowledge of configuration of antenna panels for the devices equipped with antenna panels, and antenna radiation patterns to determine the interfering transmissions that are going to hit the intended SL Rx.

The SL Tx can apply suitable weight to interference compensations based on knowledge of the interferer (location, beam direction, number of overlapping sub-channels with the target transmission etc.), SL Tx transmission parameters (transmit direction, beamwidth, target range), the knowledge of the target SL Rx (location, direction, receive beamforming parameters etc.), or/and the relative priority of the interferer.

The SL Tx can estimate how the interference estimation done locally will be projected to the SL Rx.

The SL Tx can use the cone of operation and the directions through which it received the SCIs (reservations) to gauge the interference at the SL Rx.

The SL Tx can receive feedback from the SL Rx to compute the interference estimate. The feedback may comprise of a finite set of strongest interferers on the allocated sub-channels. It may also include the aspects related to the directions through which SL Rx is receiving interference, receive beamwidth etc.

The SL Tx can reduce its power by the configured amount (based on its priority) if at least the N number of configured HARQ ACKs are received from the target SL Rx.

FIG. 6 illustrates steps the Tx UE performs to determine transmit power. The determined transmit power is then provided to the suitable block in the WTRU which is responsible for actual transmission. As part of the proposed power control solution a SL Tx performs multiple down-selection to the detected transmissions (potentially through decoded SCIs). One down-selection is to find the transmissions which overlap in time and frequency with the resource selected for own transmission. Another down-selection is to select only the transmissions which a SL Tx estimates are going to hit the intended SL Rx. Yet another down-selection is to select only the interfering transmissions for which the indicated priority is lower than the priority of own transmission. It is noted that the figure shows the down-selection steps in a given order, but they can be performed in any order, even in a single step. The goal is to reach the final set of interfering transmissions which will be compensated with suitable weights to determine the final transmit power.

Power Control in Mode 2 Based Resource Allocation

A second example embodiment according to the present principles describes a method performed by a SL Tx to carry out a SL transmission with enhanced power control for a unicast SL transmission.

The SL Tx is configured to use at least SL pathloss for power control of PSSCH with suitable parameters.

The SL Tx obtains a packet for transmission over sidelink from higher layers. The SL Tx performs autonomous resource allocation by preparing a sensing window and a resource allocation window and selects a suitable resource for its SL transmission according to the resource selection procedure.

Figure 7:
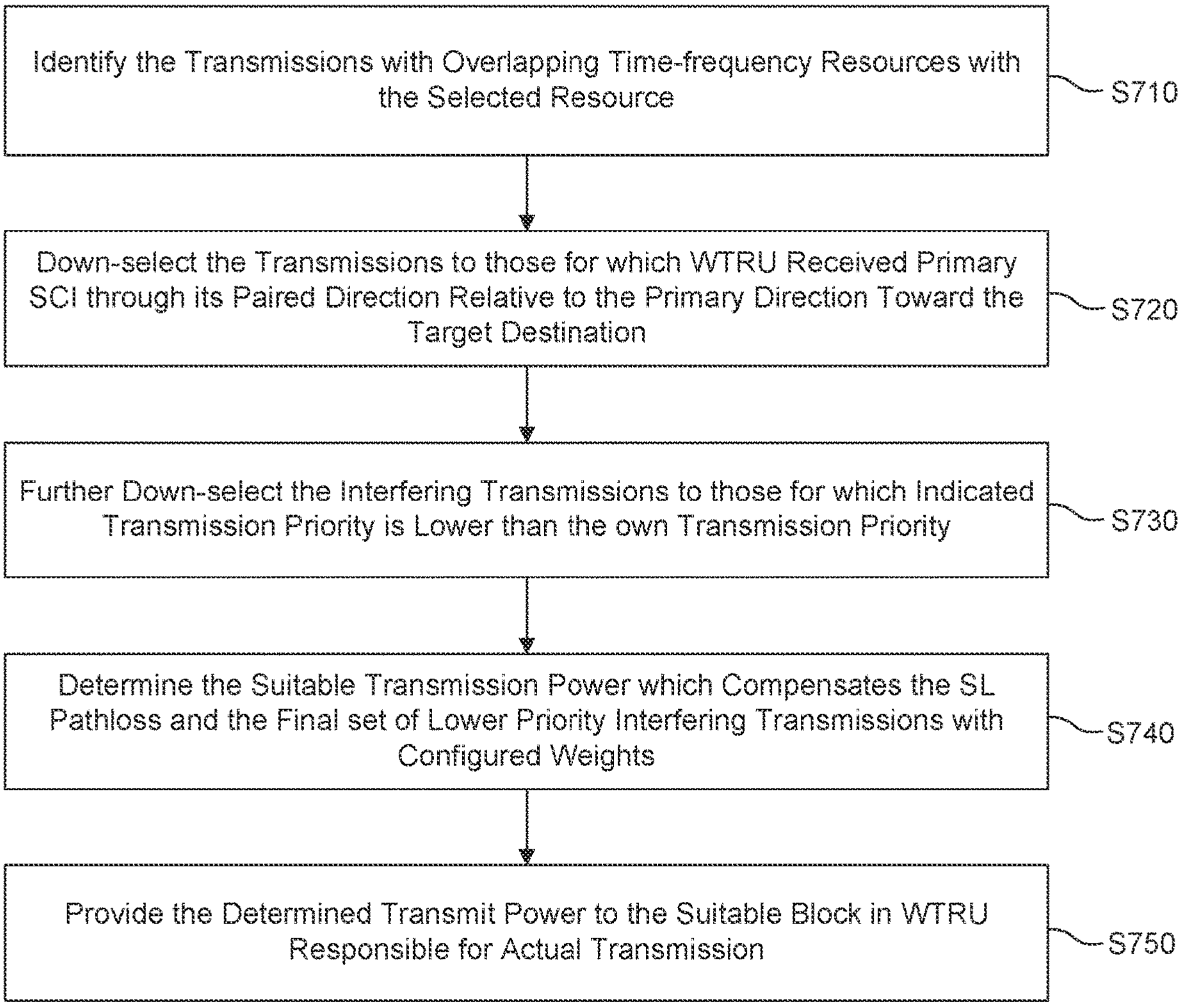
FIG. 7 illustrates a method for transmit power determination of the second example embodiment of the present principles.

FIG. 7 illustrates a method for transmit power determination of the second example embodiment of the present principles.

In step S710, the SL Tx identifies the interfering decoded SCIs which indicate future reservations having overlapping resources with its scheduled resource.

In step S720, the SL Tx down-selects the interfering decoded primary SCIs which it received through its paired direction where the paired direction is in relation to its primary direction of transmission to the target SL Rx.

In step S730, the SL Tx further down-selects the paired-received interfering decoded primary SCIs for which the indicated transmission priority is lower than the priority of own transmission.

In step S740, the SL Tx determines the SL transmission power for PSSCH and PSCCH in different symbols of SL slots according to the equations provided in this embodiment using the SL pathloss and the finally selected overlapping interference power weighted with the weights configured as part of the power control configuration.

In step S750, the SL Tx transmits $1^{st}$ stage SCI over PSCCH and SL data (along with $2^{nd}$ stage SCI) over PSSCH over the selected transmission resource with the determined transmit power.

Primary SCI can be SCI (first stage, second stage or both).

The SL Tx can transmit over the PSCCH and PSSCH in the primary direction only if it operates according to 3GPP Rel-16/17 design.

The SL Tx can transmit over the PSCCH in the primary and paired directions and over the PSSCH in the primary direction only if it is configured to operate under primary/paired transmission scheme.

The SL Tx can track the resources in its transmission resource pools and maintain the RSSI and RSRP for the decoded SCIs.

The SL Tx can compute the interference estimate over its allocated resources from the detected SCIs which indicate reservations over the same resource as allocated to the SL Tx.

The SL Tx can apply suitable weight to interference compensations based on knowledge of the interferer (for example location, beam direction, number of overlapping sub-channels with the target transmission etc.), SL Tx transmission parameters (for example transmit direction, beamwidth, target range), the knowledge of the target SL Rx (for example location, direction, receive beamforming parameters etc.), or/and the relative priority of the interferer.

The SL Tx can apply suitable weight as a function of RSSI over the allocated sub-channels.

The SL Tx can estimate how the interference estimation done locally will be projected to the SL Rx.

The SL Tx can use the cone of operation and the directions through which it received the SCIs (reservations) to gauge the interference at the SL Rx.

SL Tx can receive feedback from the SL Rx to compute the interference estimate. The feedback may include a finite set of strongest interferers on the allocated sub-channels. It may also include the aspects related to the directions through which SL Rx is receiving interference, receive beamwidth etc.

SL Tx can reduce its power by the configured amount (based on its priority) if at least the N number of configured HARQ ACKs are received from the target SL Rx.

SL Tx can apply separate handling for primary SCI and paired SCIs for primary/paired SCI transmission/reception-based scheme. The paired SCI may be transmitted with a higher power compared to the primary SCI, where the power margin is selected based on the transmission priority.

As mentioned, FIG. 7 illustrates steps a UE can perform to compute the transmit power. The transmit power determined is then provided to the suitable block in the WTRU which is responsible for actual transmission. As part of the proposed power control solution an SL Tx performs multiple down-selection to the detected SCIs. One down-selection is to find the transmissions which overlap in time and frequency with the resource selected for own transmission. Another down-selection is to select only the transmissions for which SL Tx received primary SCIs through its paired direction, where the paired direction is relative to the primary direction toward the target SL Rx. Yet another down-selection is to select only the interfering transmissions for which the indicated priority is lower than the priority of own transmission. It is noted that FIG. 7 shows these down-selection steps in a given order, but they can be performed in any order, or even in a single step. The key is to reach the final set of interfering transmissions which will be compensated with suitable weights to determine the final transmit power as per this embodiment.

Figure 8:
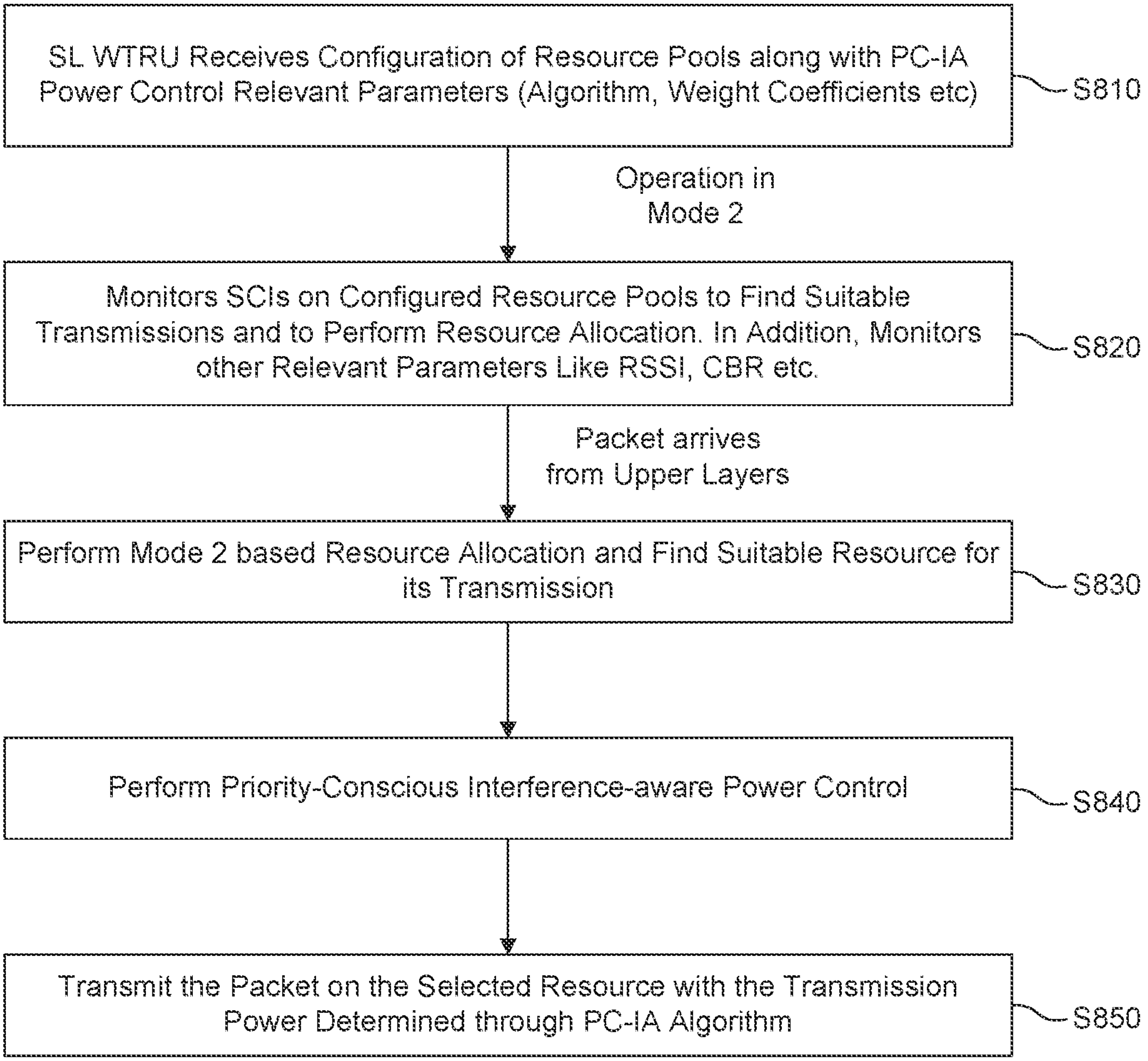
FIG. 8 illustrates packet transmission in a second example embodiment according to the present principles.

FIG. 8 illustrates a method for transmission of the second example embodiment of the present principles. The transmission is over the sidelink while operating in autonomous mode of resource allocation, so called Mode 2 based resource allocation.

In step S810, the SL Tx receives configuration information for resource pools along with PC-IA power control relevant parameters, e.g., an indication of the algorithm and weight coefficients.

The SL Tx then operates in Mode 2.

In step S820, the SL Tx monitors SCIs on configured resource pools to find suitable transmissions and to perform resource allocation. The SL Tx further monitors parameters like RSSI and CBR.

After reception of a packet from upper layers, in step S830, the SL Tx performs Mode 2 based resource allocation and finds suitable resources for its transmission.

In step S840, the SL Tx performs priority-conscious interference-aware power control to determine a transmission power.

In step S850, the SL Tx transmits the packet on the selected resource with the determined transmission power.

Power Control in Mode 1 based Resource Allocation

Figure 9:
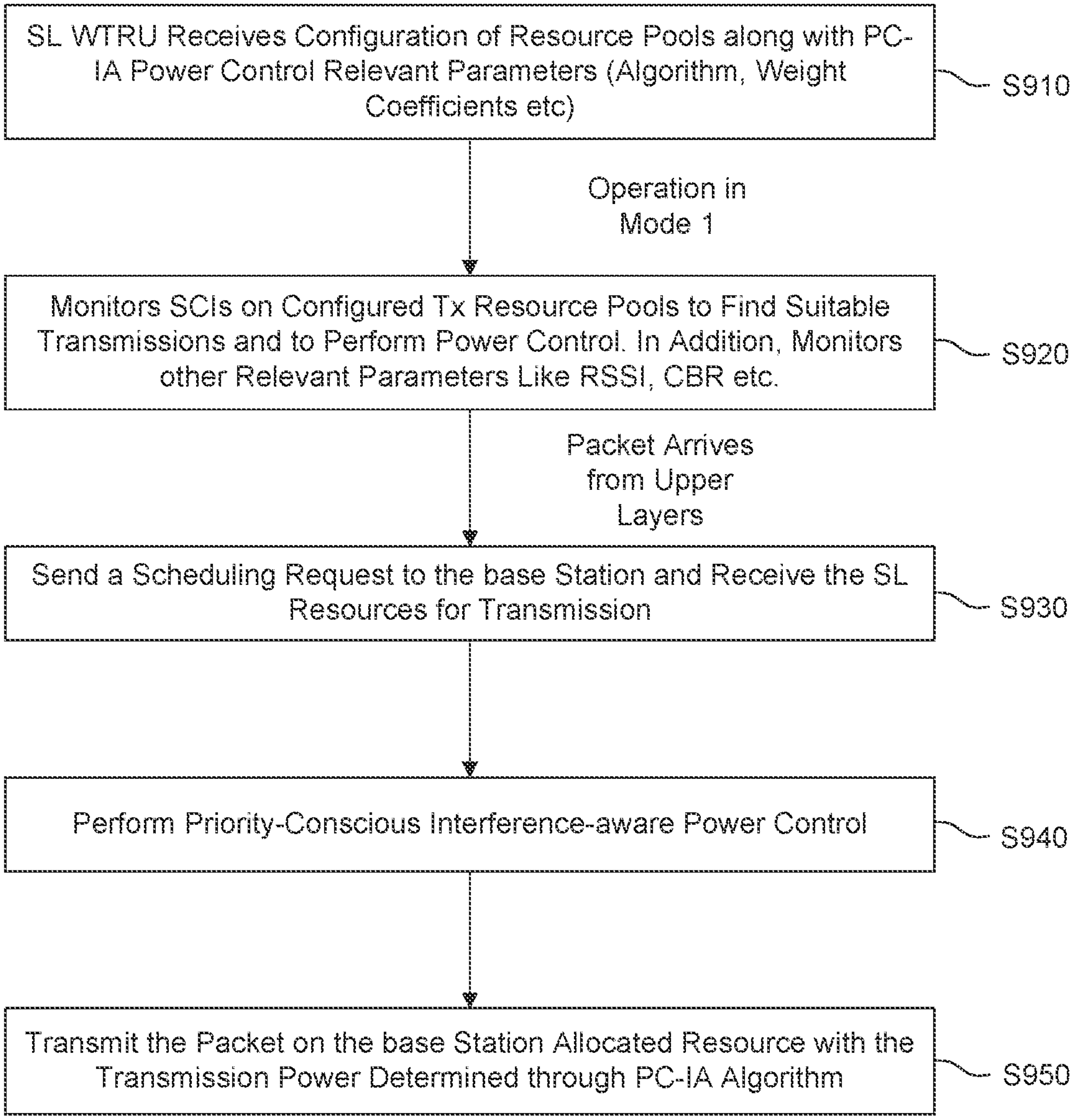
FIG. 9 illustrates packet transmission in a third example embodiment of the present principles.

FIG. 9 illustrates packet transmission in a third example embodiment of the present principles. The method is performed by a SL Tx to perform a SL transmission with enhanced power control for a unicast SL transmission.

The SL Tx is configured to use at least SL pathloss for power control of PSSCH with suitable parameters.

The SL Tx obtains a packet for transmission over sidelink from higher layers. The SL Tx sends a scheduling request to the gNB to get resources allocated over the SL and receives a grant (SL allocation) from the gNB which provides the resources allocated over sidelink.

The SL Tx identifies interfering decoded SCIs from its monitoring performed on the sidelink resource pools which indicate futures reservations having overlapping resources with its scheduled resource, down-selects the paired-received interfering decoded primary SCIs which it received through its paired direction where the paired direction is in relation to its primary direction of transmission to the target SL Rx, further down-selects the paired-received interfering decoded primary SCIs for which the indicated transmission priority is lower than the priority of own transmission, and determines the SL transmission power for PSSCH and PSCCH in different symbols of SL slots according to the equations provided in this embodiment with the weights configured as part of the power control configuration.

The SL Tx transmits $1^{st}$ stage SCI over PSCCH and SL data (along with $2^{nd}$ stage SCI) over PSSCH over the gNB allocated transmission resource with the determined transmit power.

Primary SCI can be SCI (first stage, second stage or both).

The SL Tx can transmit over the PSCCH and PSSCH in the primary direction only if it operates according to 3GPP Rel-16/17 design.

The SL Tx can transmit over the PSCCH in the primary and paired directions and over the PSSCH in the primary direction only if it is configured to operate under primary/paired transmission scheme.

The SL Tx can track the resources in its transmission resource pools and maintain the RSSI and RSRP for the decoded SCIs.

The SL Tx can compute the interference estimate over its allocated resources from the detected SCIs which indicate reservations over the same resource as allocated to the SL Tx.

The SL Tx can apply suitable weight as a function of RSSI over the allocated sub-channels.

The SL Tx can estimate how the interference estimation done locally will be projected to the SL Rx. The projection can be as per the configuration information of power control received from the gNB.

The SL Tx can use the cone of operation and the directions through which it received the SCIs (reservations) to gauge the interference at the SL Rx.

The SL Tx can receive feedback from the SL Rx to compute the interference estimate. The feedback may include a finite set of strongest interferers on the allocated sub-channels. It may also include the aspects related to the directions through which SL Rx is receiving interference, receive beamwidth etc.

The paired SCI can be transmitted with a higher power compared to the primary SCI, where the power margin is selected based on the transmission priority.

FIG. 9 illustrates a UE transmission method for sidelink transmission when operating under Mode 1 based resource allocation where the base station performs the resource allocation for its sidelink transmissions. The SL Tx keeps monitoring its configured Tx resource pools and maintains a history of future reservations and other parameters relevant for the configured power control solution. As an example, these parameters may include sub-channel and resource pool based RSSI and CBR. The duration over which averaging is to be performed over such parameters is part of the power control configuration information. An example duration can be equal to the duration of sensing window that Mode 2 based users employ to perform resource allocation. In this way, the power control solution parameters can be harmonized among SL UEs whether they are performing under Mode 1 or Mode 2 based resource allocation.

In step S910, the SL Tx receives configuration information for resource pools along with PC-IA power control relevant parameters, e.g., an indication of the algorithm and weight coefficients.

The SL Tx then operates in Mode 1.

In step S920, the SL Tx monitors SCIs on configured Tx resource pools to find suitable transmissions and to perform power control. The SL Tx further monitors parameters like RSSI and CBR.

After reception of a packet from upper layers, in step S930, the SL Tx sends a scheduling request to the base station and receives the SL resources for transmission.

In step S940, the SL Tx performs priority-conscious interference-aware power control to determine a transmission power.

In step S950, the SL Tx transmits the packet on the resource allocated by the base station with the determined transmission power.

Optimized DL Pathloss for SL Beam-Based Transmissions

Power Control for PSSCH with Respect to DL Pathloss

Legacy SL devices can be configured to perform the power control of sidelink transmission based upon the DL pathloss when the Tx device is in network coverage. A SL Tx estimates the pathloss to the serving base station (gNB) and uses this in its power control computation. When the PSSCH power control is configured to use at least the DL pathloss, the transmit power for PSSCH is determined at the Tx UE as follows (in dBm):

$$P\_pssch = \min\left(P\_max,\ P\_plDL\_Legacy,\ P\_plSL\_Legacy\right);$$

$$P\_plDL\_Legacy = P\_0DL + 10*\log\_10\ \left(2^\wedge u*M\_pssch\right) + a\_DL*PL\_DL$$

$$P\_plSL\_Legacy = P\_0SL + 10*\log\_10\ \left(2^\wedge u*M\_pssch\right) + a\_SL*PL\_SL$$

where the second term P_p1DL_Legacy and third term P_p1SL_Legacy in the argument of the min expression of the first equation are power values derived from the DL pathloss and the SL pathloss, respectively.

For this computation, the SL Tx is configured with nominal Tx power of P_0DL to be used with DL pathloss based power control, transmits using numerology 'u', and intends to transmit over the PSSCH over M_pssch PRBs. a_DL is the parameter configured for fractional power control based upon DL pathloss, and PL_DL denotes the estimate of DL pathloss at Tx UE.

DL PL based power control tries to contain the interference to uplink transmissions at the gNB. This is important when the SL and UL are operating in the same band and SL transmissions generate interference for UL transmissions harming their correct reception at the base station. DL PL based power control is very limiting for sidelink transmissions. If a SL Tx is located close to the gNB, it will have a smaller DL pathloss, thus will transmit its SL transmission with low transmission power. If the target SL Rx of such a SL Tx has larger relative distance compared to the gNB from SL Tx, it has larger pathloss and the power control applied by the SL Tx will limit the correct reception at the target SL Rx. On the other hand, if SL Tx is close to cell edge, it may have larger DL pathloss and will transmit with higher SL power. If the SL Rx for such a SL Tx is located close and has much lower relative distance and pathloss compared to the gNB, a SL Tx does not need to transmit with such higher power to reach this Rx located very close. In this case, this transmission can be very power inefficient.

In addition, this computation of power control can be suitable for (close to) omni-directional transmissions. Nevertheless, for directional transmissions which is the de facto mode of operation at high carrier frequencies, the power control based upon this formula is typically sub-optimal.

A focus of this embodiment is to provide computation of sidelink transmission power with respect to DL Pathloss for directional sidelink transmission. This can then allow more precise SL transmit power computation without harming the base station reception of other uplink transmissions. Nevertheless, it's more meaningful to use SL pathloss based power control for sidelink transmission and use the DL pathloss based transmission power as an upper limit and limit the actual transmit power in case SL pathloss based power control exceeds this limit.

For the SL transmissions that are not directed to the gNB, it would not make sense to apply power control considering DL pathloss without consideration to directional aspects. It is proposed to impose the real constraint in the form of power received at the gNB taking into account the directional nature of transmission.

If a SL Tx is configured to consider DL pathloss for SL power control and is configured with appropriate parameters relevant to apply to DL pathloss to compute SL power, in addition to those parameters, it uses the directionality of its transmission to compute SL transmission power. The directionality incorporates the intended transmission direction of SL Tx and the direction of the gNB from SL Tx. In addition, it may use the transmit pattern, beam width and the information of main lobes and side lobes if such information is available.

As an example, a SL Tx applies the following equation to compute SL transmission power with respect to DL pathloss:

$$P\_plDL = F\left(P\_0DL + 10 * \log\_10\left[2^{\wedge}u * M\_pssch\right] + a\_DL * PL\_DL\right)$$

where F is a transformation which incorporates the directionality of the transmission and the direction of the gNB from the SL Tx.

The direction could be incorporated in different ways. As the directions to the target Rx and the serving gNB are typically known at a potential Tx, the angle between these directions can be known. For example, the angle between the selected UE Tx/Rx beam used to communicate with the serving gNB and the selected UE Tx beam used to communicate with the target SL Rx may be derived. The angle may be derived both in azimuth and elevation directions.

Figure 10:
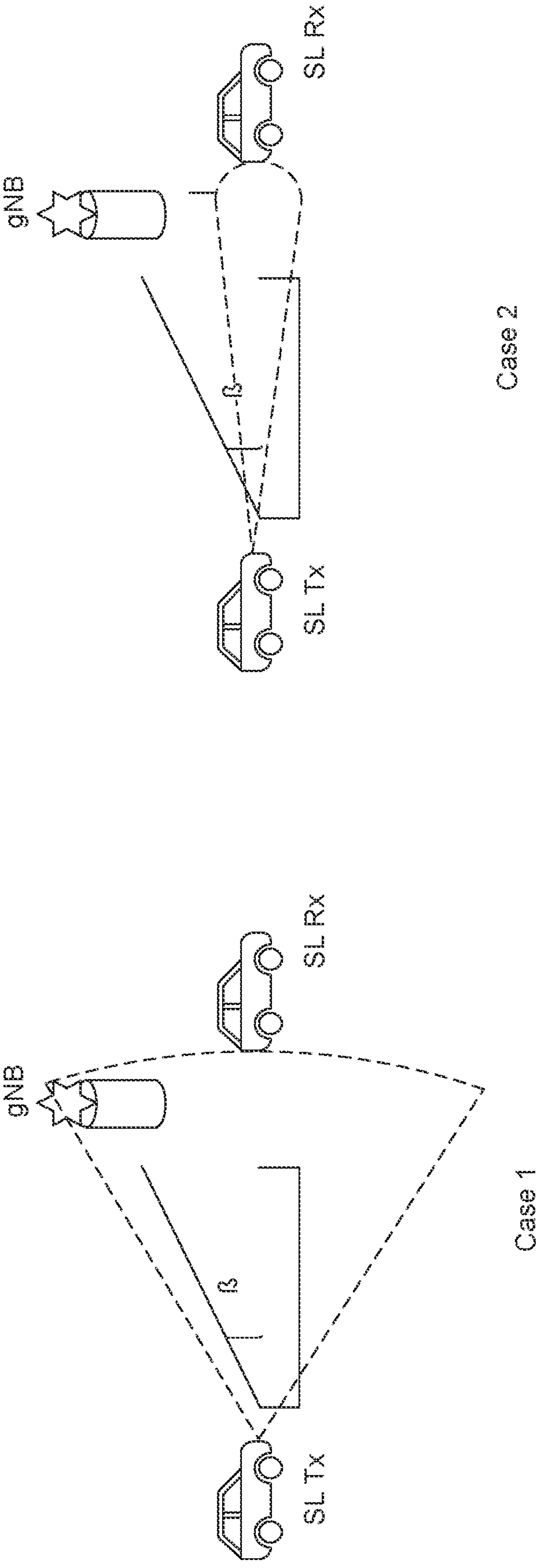
FIG. 10 illustrates two example transmission cases for a 2D plane.

FIG. 10 illustrates two example transmission cases for a 2D plane (e.g., elevation angle between the two directions is zero). For case 1, the SL Tx intends to transmit to SL Rx. Assuming that the angle (e.g., azimuth angle) between the intended transmit direction and the gNB is β, given that the beam width is such that the transmit power will be received at the gNB, the received power at the gNB will be the cos(β) fraction of the power transmitted by the SL Tx in the direction of SL Rx. Thus, considering this reduction, SL Tx can compute the transmit power based upon DL pathloss as:

$$P\_plDL = P\_0DL + 10 * \log\_10\left(2^{\wedge}u * M\_pssch\right) + a\_DL * PL\_DL + 10 * \log\_10\ (g * \cos\beta).$$

In this equation, g denotes a coefficient which may provide additional flexibility by weighing up or down the cos β term. The value of weighting coefficient g may be configured to the UE, e.g., by the network or serving gNB.

For a 3D plane case, assuming that the azimuth angle of β and elevation angle of φ between the direction towards the target SL Rx and the directions towards the serving gNB, SL Tx can compute the transmit power based upon DL pathloss as:

$$P\_plDL = P\_0DL + 10 * \log\_10\left(2^{\wedge}u * M\_pssch\right) + a\_DL * PL\_DL + 10 * \log\_10\ (g * \cos\beta * \cos\varphi).$$

In this equation, different weighting coefficients may be configured to fractions of powers in azimuth and elevation directions. For example, as in the following equation, where g1 is the weight assigned to the power fraction in the azimuth direction and g2 is the weight assigned to the power fraction in the elevation direction:

$$P\_plDL = P\_0DL + 10 * \log\_10\left(2^{\wedge}u * M\_pssch\right) + a\_DL * PL\_DL + 10 * \log\_10\ (g1 * \cos\beta * \cos * g2 * \cos\varphi).$$

Case 2 keeps the same locations for Tx, Rx and the gNB as in case 1. This highlights a scenario where the transmission from SL Tx is highly directional with a very narrow beam to the intended SL Rx. It is noted that such highly narrow beam transmissions are typical at very high frequencies where there are very few paths carrying signal power. The knowledge of its own beamwidth allows the SL Tx to determine that practically no power will be received at the gNB, and thus for all practical purposes, it can ignore the limitation of SL interference seen at the gNB for its intended transmission.

Figure 11:
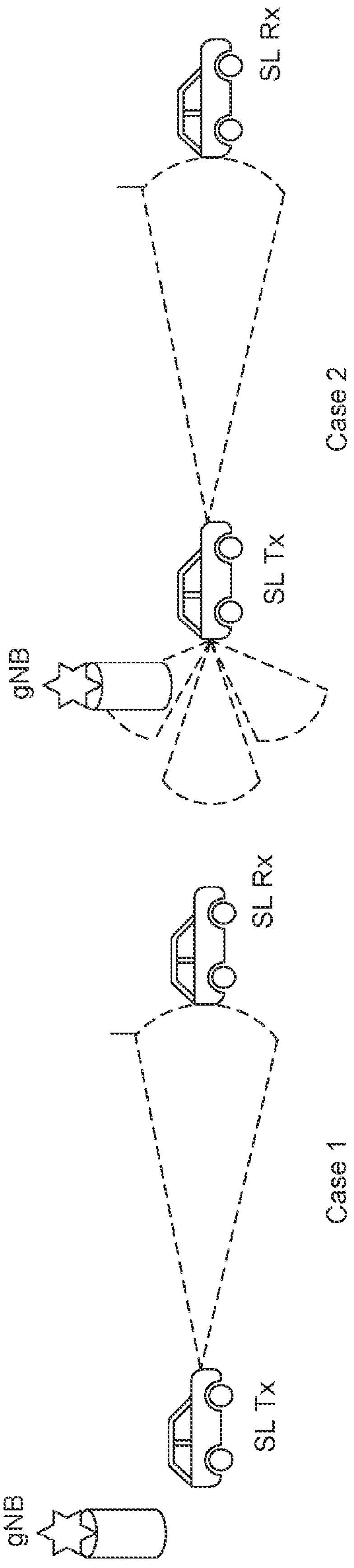
FIG. 11 illustrates two further example transmission cases for a 2D plane.

FIG. 11 illustrates two further example transmission cases for a 2D plane. The examples cases illustrate possible refinements that may be used to compute the SL transmit power based upon DL pathloss to limit the interference seen at the gNB. Case 1 shows a deployment of SL Tx, SL Rx and the gNB with SL Tx configured to use at least DL based power computation. With the knowledge of its intended transmit direction to SL Rx, beam width and the location of the gNB, SL Tx determines that no power will be effectively directed to the gNB, and hence it does not need to consider the gNB interference for its SL transmit power determination. Depending upon the configuration, it can either transmit with its maximum transmit power, or the power computation based upon SL pathloss or the enhanced versions of SL power control using SL priority and the interference nulling at the SL Rx.

Case 2 uses the same example deployment as case 1, but illustrates an additional refinement method for the SL power computation based upon DL pathloss. In case 2, the SL Tx is shown to have the detailed knowledge of its antenna pattern. With knowledge of the gNB position and its own antenna radiation pattern, the SL Tx determines that the transmission to its target SL Rx will result in back lobes and side lobes such that the gNB will receive its signal energy from one of its backside lobes. SL Tx can then determine the fractional power that will leak into the direction of the gNB. This fractional power then needs to be plugged in the above equations replacing 10*log_10 (g*cos β) or 10*log_10 (g*cos β*cos φ) term.

Power Control for Sidelink Feedback Channel

The feedback channel on SL, PSFCH, can also be configured to follow the power control based upon DL pathloss. Although the parameters to be used in the power control computation for PSFCH are configured separately from PSSCH parameters, the behavior and equations are very similar to the ones used for PSSCH configured to operate with DL pathloss. Thus, all the above discussion on power control based upon DL pathloss made in the context of PSSCH can be applied to the power control of SL PSFCH.

Power Control for Sidelink Synchronization Sequence Blocks (S-SSB)

In conventional solutions, S-SSB power is computed based upon the DL pathloss when an SL device transmits S-SSB in Mode 1. This limitation is with respect to the same constraint of avoiding the interference at the gNB for its uplink reception. A SL UE configured to transmit S-SSB may be configured to use the DL pathloss for power control as:

$$P\_sssb = \min\left(P\_max,\ P\_0DLSSSB + 10*\log\_10\left(2^{\wedge}*M\_sssb\right) + a\_DLSSSB*PL\_DL\right);$$

where P_max is the maximum power configured for the SL UE, P_0DLSSB is the nominal power for S-SSB, u is the numerology for S-SSB transmission, M_sssb is the number of PRBs used for S-SSB transmission which is fixed to 11 in the current standard, a_DLSSSB is the coefficient to be applied to the downlink pathloss PL_DL.

As has been discussed, directionality aspects weigh heavily on how the base station (the gNB) will see the interference from a given transmission. Thus, the S-SSB transmissions which are not aligned to the direction of the gNB from the transmitting SL device will have little to no impact for the gNB reception of uplink transmissions. From this perspective, the power control for S-SSB can be based upon the proposition of this embodiment incorporating the directionality of the transmission where SL UE intends to transmit this S-SSB. Thus, the DL pathloss based S-SSB transmit power computation can be updated with respect to the directionality of the S-SSB transmission and the direction of the gNB. An example of is:

$$P\_sssb\_Proposal = \min\left(P\_max,\ P\_0DLSSSB + 10*\log\_10\left(2^{\wedge}*M\_sssb\right) + a\_DLSSSB*PL\_DL + 10*\log\_10(g1*\cos\beta*g2*\cos\varphi)\right);$$

where β is the azimuth angle and the φ is the elevation angle at the SL Tx between the S-SSB transmission direction and the direction of the gNB. Furthermore, g1 and g2 are the weights configured to the power fractions in the azimuth and the elevation angles.

Other refinements proposed for DL pathloss based power computation for PSSCH, namely incorporating the beam width, antenna radiation patterns, etc. all apply to the power control of S-SSB transmissions to compensate the DL pathloss. In the extreme case, for beams not directed toward the gNB where the gNB will not receive any signal energy from S-SSB transmission, the DL pathloss limitation vanishes, and the SL UEs may transmit S-SSB with the configured max power to increase the coverage of UEs using indirectly the gNB as the sync reference. In this way, these refinements can here have a positive impact on the system in at least two ways. First, due to precise control, no interference more than nominal configured through power control parameters is generated by the S-SSB transmissions. Second, the more accurate computation with respect to directionality aspects allows to use higher power for S-SSB transmission which leads to have more SL devices seeing this sync-reference UE which is directly attached to the gNB.

Example Embodiment—Power Control of SL Channels with Respect to DL Pathloss

Figure 12:
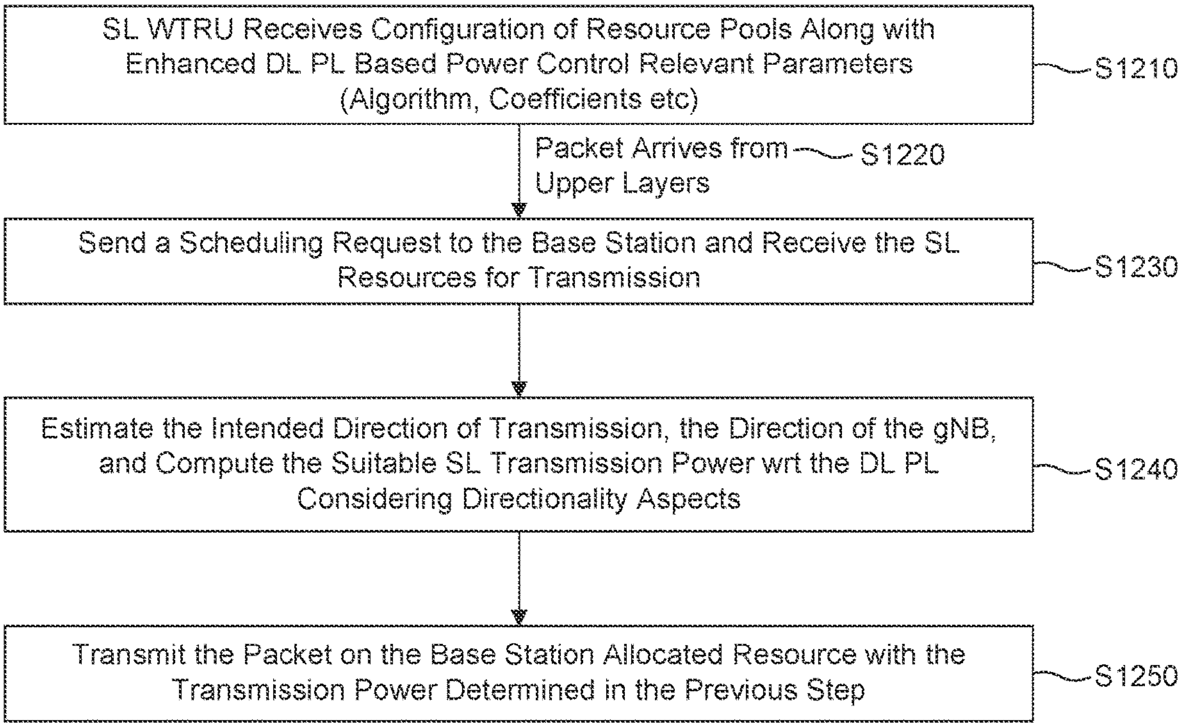
FIG. 12 illustrates an example embodiment of a method for SL transmission with enhanced power control for a unicast SL transmission according to the present principles.

In an example embodiment of the present principles illustrated in FIG. 12, a SL Tx performs a method for SL transmission with enhanced power control for a unicast SL transmission.

In step S1210, the SL Tx is configured to use at least DL pathloss for power control of PSSCH with suitable parameters. To this end, the SL Tx receives configuration information of resource pools along with parameters, e.g., an identifier of an algorithm and coefficients, for enhanced DL PL based power control.

In step S1220, the SL Tx obtains a packet for transmission over sidelink from higher layers.

In step S1230, the SL Tx sends a scheduling request to the gNB to get resources allocated over the SL. In response, the SL Tx then receives from the gNB a grant (SL allocation) that provides the resources allocated over sidelink.

In step S1240, the SL Tx determines the intended direction of transmission to the target SL Rx, determines the direction of the gNB, computes the angle between the intended direction of transmission and the direction of the gNB, and determines the SL transmission power for PSSCH and PSCCH in different symbols of SL slots according to the equations provided in this embodiment with the weights configured as part of the power control configuration.

In step S1250, the SL Tx transmits $1^{st}$ stage SCI over PSCCH and SL data (along with $2^{nd}$ stage SCI) over PSSCH over the gNB allocated transmission resource with the determined transmit power. The SL Tx can transmit over the PSCCH and PSSCH in the primary direction only if it operates according to 3GPP Rel-16/17 design.

The SL Tx can transmit over the PSCCH in the primary and paired directions and over the PSSCH in the primary direction only if it is configured to operate under primary/paired transmission scheme.

The SL Tx can transmit PSFCH over the PSFCH resource determined in relation to PSSCH resource with the power determined with respect to proposed DL pathloss based approach where it received a transmission.

The SL Tx can be configured/indicated to transmit S-SSB and determine the transmit power for S-SSB using the described way.

The SL Tx can use the transmit beamwidth information to refine further the estimated interference at the gNB.

The SL Tx can use its antenna radiation pattern to compute the interference seen at the gNB.

The SL Tx can use the knowledge/location of multiple TRPs and multiple gNBs present in the vicinity and apply the directionality-based power transmission determination procedure with respect to its known TRPs/gNBs, and choose the smallest transmission power from these determined transmission power values.

It is noted that the split of transmission power between PSSCH and PSCCH is not detailed, but it can be done using simple division with respect to how many PRBs each physical channel uses.

CONCLUSION

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices that include processors are noted. These devices may include at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples include one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components included within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may include usage of the introductory phrases "at least one" and "one or more" to introduce claim recitations. However, the use of such phrases should not be construed to imply that the introduction of a claim recitation by the indefinite articles "a" or "an" limits any particular claim including such introduced claim recitation to embodiments including only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero. And the term "multiple", as used herein, is intended to be synonymous with "a plurality".

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

The following references may have been referred to herein above and are incorporated herein by reference in their entirety.

[1] 3GPP, "TR 22.886: Study on enhancement of 3GPP Support for 5G V2X Services (v16.2.0, Release 16)," 3GPP, Tech. Rep., December 2018.

[2] 3GPP, "TS 22.186 Service requirements for enhanced V2X scenarios (v16.2.0, Release 16)," 3GPP, Tech. Spec., June 2019.

[3] M. H. C. Garcia et al., "A Tutorial on 5GNR V2X Communications," in IEEE Communications Surveys & Tutorials, February 2021.

[4] 3GPP, "TS 38.214 Physical layer procedures for data (Release 16)," V16.1.0, March 2020.

[5] 3GPP, "TS 38.331 Radio Resource Control (RRC) protocol specification (Release 16)," V16.0.0, March 2020.

[6] 3GPP, "TS 38.215 Physical layer measurements (Release 16)," V16.3.0, September 2020.

[7] 3GPP, "TR 37.885 Study on evaluation methodology of new Vehicle-to-Everything (V2X) use cases for LTE and NR," June 2019, v15.3.0.

[8] LG Electronics, "R1-1908900: Discussion on physical layer structure for NR sidelink," 3GPP TSG-RAN WG1 Meeting 98, August 2019.

What is claimed is:

1. A method implemented by a first, wireless transmit/receive unit (WTRU), the method comprising:

sensing, by the first WTRU, for at least one signal, using:
a first signal strength of a first receive beam in a first direction associated with an upcoming sidelink unicast transmission to a target WTRU and a second signal strength of a second receive beam in a second direction opposite the first direction;

determining, from the at least one sensed signal, scheduled transmissions that will interfere with the upcoming sidelink unicast transmission based on the scheduled transmissions overlapping in time and frequency with the upcoming sidelink unicast transmission and having a lower priority than the upcoming sidelink unicast transmission;

determining, by the first WTRU, a transmission power to compensate for: pathloss to the target WTRU and estimated interference at the target WTRU of the scheduled transmissions, the estimated interference based on respective received signal strengths of the at least one sensed signal; and sending, by the first WTRU to the target WTRU, data in the sidelink unicast transmission using the determined transmission power.

2. The method of claim 1, wherein the at least one sensed signal carries sidelink control information.

3. The method of claim 2, wherein the sidelink control information includes information indicating a reservation of resources that a transmitter of the sensed signal will use for a scheduled transmission.

4. The method of claim 3, wherein the reservation includes information indicating a time and a frequency for the corresponding scheduled transmission.

5. The method of claim 3, wherein the reservation includes information indicating a transmit power for the corresponding scheduled transmission.

6. The method of claim 1, wherein the estimated interference at the target WTRU is further based on information received from the target WTRU.

7. The method of claim 1, wherein the estimated interference is further based on a measure of distance between the WTRU and the target WTRU.

8. The method of claim 1, wherein the estimated interference at the target WTRU is compensated for only for scheduled transmissions corresponding to sensed signals transmitted in a primary direction by corresponding transmitters, the sensed signals received using the second receive beam.

9. A non-transitory computer-readable storage medium storing instructions that, when executed, cause at least one hardware processor perform the method of claim 1.

10. A first wireless transmit/receive unit (WTRU), comprising:

memory storing processor-executable program instructions; and at least one hardware processor configured to execute the program instructions to:

sense, by the first WTRU, for at least one signal, using: a first signal strength of a first receive beam in a first direction associated with an upcoming sidelink unicast transmission to a target WTRU and a second signal strength of a second receive beam in a second direction opposite the first direction;

determine, from the at least one sensed signal, scheduled transmissions that will interfere with the upcoming sidelink unicast transmission based on the scheduled transmissions overlapping in time and frequency with the upcoming sidelink unicast transmission and having a lower priority than the upcoming sidelink unicast transmission;

determine, by the first WTRU, a transmission power to compensate for: pathloss to the target WTRU and estimated interference at the target WTRU of the scheduled transmissions, the estimated interference based on respective received signal strengths of the at least one sensed signal; and send, by the first WTRU to the target WTRU, data in the sidelink unicast transmission using the determined transmission power.

11. The first WTRU of claim 10, wherein the at least one sensed signal carries sidelink control information.

12. The first WTRU of claim 11, wherein the sidelink control information includes information indicating a reservation of resources that a transmitter of the sensed signal will use for a scheduled transmission.

13. The first WTRU of claim 12, wherein the reservation includes information indicating a time and a frequency for the corresponding scheduled transmission.

14. The first WTRU of claim 12, wherein the reservation includes information indicating a transmit power for the corresponding scheduled transmission.

15. The first WTRU of claim 10, wherein the estimated interference at the target WTRU is further based on information received from the target WTRU.

16. The first WTRU of claim 10, wherein the estimated interference is further based on a measure of distance between the WTRU and the target WTRU.

17. The first WTRU of claim 10, wherein the at least one hardware processor is configured to execute the program instructions further to compensate for the estimated interference at the target WTRU only for scheduled transmissions corresponding to sensed signals transmitted in a primary direction by corresponding transmitters of the WTRU, the sensed signals received using the second receive beam.

18. The first WTRU of claim 10, wherein the at least one hardware processor is configured to execute the program instructions further to compensate for estimated interference at the target WTRU of only the N strongest scheduled transmissions.

19. The first WTRU of claim 10, wherein the WTRU is configured to be at least one of located in a vehicle and worn by a human.

20. The first WTRU of claim 10, wherein the WTRU is one of a smartphone, a tablet, a virtual reality headset, a head-mounted-display, and glasses.

* * * * *